(12) United States Patent
Zeiler et al.

(10) Patent No.: US 11,672,201 B2
(45) Date of Patent: Jun. 13, 2023

(54) MODULAR MOWER DECK FOR USE WITH A LAWNMOWER

(71) Applicant: Briggs & Stratton, LLC, Wauwatosa, WI (US)

(72) Inventors: Jeffrey Zeiler, Brookfield, WI (US); Todd Johnson, Wauwatosa, WI (US); Christopher Krajewski, West Allis, WI (US); Nicholas Zeidler, Brookfield, WI (US); Jacob Schmalz, Milwaukee, WI (US); Bryan Keith Dandridge, Waukesha, WI (US); Matthew Steven Zurawski, Whitewater, WI (US); Ryan Hahn, Elm Grove, WI (US); Ryan Jaskowiak, Eagle, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 623 days.

(21) Appl. No.: 16/639,104

(22) PCT Filed: Aug. 16, 2018

(86) PCT No.: PCT/IB2018/056156
§ 371 (c)(1),
(2) Date: Feb. 13, 2020

(87) PCT Pub. No.: WO2019/035021
PCT Pub. Date: Feb. 21, 2019

(65) Prior Publication Data
US 2020/0205338 A1 Jul. 2, 2020

Related U.S. Application Data

(60) Provisional application No. 62/653,888, filed on Apr. 6, 2018, provisional application No. 62/546,284, filed on Aug. 16, 2017.

(51) Int. Cl.
*A01D 34/00* (2006.01)
*A01D 34/66* (2006.01)
(Continued)

(52) U.S. Cl.
CPC .......... *A01D 34/66* (2013.01); *A01D 34/008* (2013.01); *A01D 34/71* (2013.01); *A01D 34/78* (2013.01);
(Continued)

(58) Field of Classification Search
CPC ...... A01D 34/66; A01D 34/008; A01D 34/71; A01D 34/78; A01D 34/81; B60K 1/02;
(Continued)

(56) References Cited

U.S. PATENT DOCUMENTS

| 4,637,625 A | 1/1987 | Blackwell |
| 4,930,298 A * | 6/1990 | Zenner .................. A01D 34/81 |
| | | 56/320.1 |

(Continued)

OTHER PUBLICATIONS

International Search Report and Written Opinion, PCT/IB2018/056156, Briggs & Stratton Corporation (dated Dec. 27, 2018).

*Primary Examiner* — Hau V Phan
(74) *Attorney, Agent, or Firm* — Foley & Lardner LLP

(57) ABSTRACT

A ride-on vehicle, such as a zero turn radius lawnmower, includes a main chassis having first and second pivot joints, a first rocker arm having a caster wheel on a first end portion and a drive wheel on a second end portion, and a second rocker arm having a caster wheel on a first end portion and a drive wheel on a second end portion, wherein the first rocker arm and the second rocker arm are independently pivotally coupled to the respective first and second pivot joints of the main chassis at a location between the caster wheels and the drive wheels. The ride-on vehicle may also include a modular mower deck assembly with a plurality of mower deck modules having a blade assembly, an electric (Continued)

blade motor configured to provide rotation to the blade assembly, and an attachment assembly configured to enable attachment between adjacent mower deck modules.

20 Claims, 30 Drawing Sheets

(51) Int. Cl.
| | |
|---|---|
| *A01D 34/71* | (2006.01) |
| *A01D 34/78* | (2006.01) |
| *A01D 34/82* | (2006.01) |
| *A01D 67/04* | (2006.01) |
| *B60G 15/06* | (2006.01) |
| *B60K 1/02* | (2006.01) |
| *B60K 7/00* | (2006.01) |
| *B60K 35/00* | (2006.01) |
| *B60N 2/015* | (2006.01) |
| *B62D 1/04* | (2006.01) |
| *B62D 15/02* | (2006.01) |
| *B62D 21/02* | (2006.01) |
| *B62D 21/11* | (2006.01) |
| *E01H 5/06* | (2006.01) |
| *A01D 101/00* | (2006.01) |

(52) U.S. Cl.
CPC .......... *A01D 34/824* (2013.01); *A01D 67/04* (2013.01); *B60G 15/062* (2013.01); *B60G 15/067* (2013.01); *B60K 1/02* (2013.01); *B60K 7/0007* (2013.01); *B60K 35/00* (2013.01); *B60N 2/015* (2013.01); *B62D 1/046* (2013.01); *B62D 15/021* (2013.01); *B62D 21/02* (2013.01); *B62D 21/11* (2013.01); *E01H 5/061* (2013.01); *A01D 2101/00* (2013.01); *B60K 2370/143* (2019.05); *B60K 2370/152* (2019.05)

(58) Field of Classification Search
CPC ...... B60K 7/0007; B60K 35/00; B62D 1/049; B62D 21/02; B62D 21/11
See application file for complete search history.

(56) References Cited

U.S. PATENT DOCUMENTS

| | | | | |
|---|---|---|---|---|
| 5,177,942 | A | * | 1/1993 | Hager .................. A01D 34/662 56/289 |
| 5,606,851 | A | * | 3/1997 | Bruener ................ A01D 34/74 56/10.8 |
| 5,743,347 | A | * | 4/1998 | Gingerich ........... B60L 15/2036 180/2.2 |
| 5,771,669 | A | | 6/1998 | Langworthy et al. |
| 5,832,708 | A | * | 11/1998 | Sugden .............. A01D 43/0631 56/16.6 |
| 6,192,666 | B1 | | 2/2001 | Sugden et al. |
| 6,826,895 | B2 | * | 12/2004 | Iida ...................... A01D 34/828 56/11.9 |
| 7,146,791 | B2 | * | 12/2006 | Benway ............... A01D 42/005 56/320.2 |
| 9,220,194 | B2 | * | 12/2015 | Ulmefors ............. A01D 34/866 |
| 9,485,911 | B2 | * | 11/2016 | Thorman ............ A01D 42/005 |
| 2013/0145736 | A1 | * | 6/2013 | Deutschle ........... A01D 75/306 56/6 |
| 2014/0137528 | A1 | * | 5/2014 | Schygge ............... A01D 34/78 180/14.1 |
| 2015/0359174 | A1 | * | 12/2015 | Ito ......................... A01D 34/81 56/16.9 |

* cited by examiner

MODULAR MOWER DECK FOR USE WITH A LAWNMOWER

CROSS-REFERENCE TO RELATED APPLICATIONS

This patent document claims priority to U.S. Provisional Patent Application No. 62/546,284, filed Aug. 16, 2017, and U.S. Provisional Patent Application No. 62/653,888, filed Apr. 6, 2018. The disclosure of each priority application is fully incorporated by reference.

BACKGROUND

The present disclosure relates generally to outdoor power equipment such as zero turn radius lawnmowers, or "mowers", and more particularly to a zero turn radius mower having a pair of rear drive wheels and a pair of front caster wheels, wherein each rear drive wheel is coupled to a respective front caster wheel by a rocker arm such that the rear drive wheels and the front caster wheels are related in rotation about a single pivot axis. Various steering/drive control configurations and mower deck configurations for a zero turn radius mower are also disclosed.

The use of zero turn radius mowers has become prevalent among both commercial and residential operators due to, for example, the mowers' maneuverability, relatively high operating speed, and wide cutting area. Many variations of zero turn radius mowers exist, including ride-on units, stand-on units, and walk-behind units. Due to their use at relatively high speeds over uneven, rough terrain, some mowers (particularly ride-on mowers) may utilize front and/or rear suspension systems in order to better provide operator comfort and improve cutting performance.

While front and/or rear suspension included on some zero turn radius mowers does provide for increased operator comfort and improved cutting performance, suspension configurations, as well as overall mower drive configurations, have been fairly limited due to the spacing and location constraints of internal combustion engines, hydraulic motors/pumps, drive belts, etc. For example, on many ride-on zero turn mowers, the operator is seated in an upright position, with the seat located substantially in-line with centerline radial axis of the mower's rear drive wheels. The mower's steering and drive controls are generally provided as two levers within forward reach of the seated operator, thereby allowing the operator to manipulate the controls through simple arm motions. However, while such operator positioning may be ideal for short periods of time over even terrain, many zero turn radius mowers are operated for long periods of time each day, often over rough, uneven terrain. With the operator positioned substantially in-line with the centerline radial axis of the mower's rear drive wheels, the vertical forces experienced by the rear drive wheels when travelling over dips, curbs, bumps, and other uneven terrain may transferred directly to the operator's seated location. While rear wheel suspension may dampen these vertical forces, impacts are still felt by the operator, particularly over long-term use of the mower. Furthermore, as the steering and drive control levers are manipulated through arm motions, the operator cannot rely on the control levers to provide additional support when traversing uneven terrain, thereby leaving all or most of the operator's weight to be supported by the seat.

In addition to being somewhat limited in operator positioning and steering control configurations, many zero turn mowers also have limited options for mower deck configurations. These mower deck configurations may be restricted by space considerations below the mower and between the rear drive wheels and front caster wheels, as well as by the blade drive configurations, which often rely on a single belt driven by an internal combustion engine or other powerhead to provide rotation for each blade of the mower deck. Due to these constraints, the flexibility and customizability of the mower deck may be limited. Additionally, the options for grass clipping distribution and/or discharge may also be restricted.

This patent document described devices that are intended to address the issues discussed above and/or other issues.

SUMMARY

In accordance with an aspect of the disclosure, a modular mower deck for use with a lawnmower is disclosed. The modular mower deck may include a plurality of mower deck modules, each of the mower deck modules having a blade assembly, the blade assembly comprising at least one mower blade, an electric blade motor configured to provide rotation to the blade assembly, and an attachment assembly configured to enable attachment between adjacent mower deck modules. At least one of the plurality of mower deck modules may be configured to be removably attachable to another one of the plurality of mower deck modules.

In accordance with an aspect of the disclosure, a ride-on vehicle is disclosed, the ride-on vehicle including a main chassis, the main chassis having a first pivot joint on a first side and a second pivot joint on a second side opposite the first pivot joint on the first side, a first rocker arm having a first end portion and a second end portion, the first rocker arm pivotally coupled to the first pivot joint of the main chassis at a location between the first end portion and the second end portion of the first rocker arm, and a second rocker arm having a first end portion and a second end portion, the second rocker arm pivotally coupled to the second pivot joint of the main chassis at a location between the first end portion and the second end portion of the second rocker arm. The ride-on vehicle may also include a first caster wheel rotatably coupled to the first end portion of the first rocker arm, a second caster wheel rotatably coupled to the first end portion of the second rocker arm, a first drive wheel rotatably coupled to the second end portion of the first rocker arm, and a second drive wheel rotatably coupled to the second end portion of the second rocker arm.

According to another aspect of the disclosure, an outdoor power equipment device is disclosed, the outdoor power equipment device including a main chassis, the main chassis having a first pivot joint on a first lateral side and a second pivot joint on a second lateral side opposite the first pivot joint on the first lateral side, wherein the first pivot joint and the second pivot joint share a common axis, a first rocker arm having a first wheel rotatably coupled at a first end portion and a second wheel rotatably coupled at a second end portion, the first rocker arm pivotally coupled to the first pivot joint of the main chassis at a location between the first wheel and the second wheel, and a second rocker arm having a first wheel rotatably coupled at a first end portion and a second wheel rotatably coupled at a second end portion, the second rocker arm pivotally coupled to the second pivot joint of the main chassis at a location between the first wheel and the second wheel. The outdoor power equipment device may also include an operator seat extending from the main chassis at least partially between the second wheel rotatably coupled to the first rocker arm and the second wheel rotatably coupled to the second rocker arm, wherein an operator may be configured to be seated on the operator seat at a position displaced from a centerline radial axis of each of the second wheels such that vertical force imparted on the second wheels is not in line with the operator's seated position.

According to another aspect of the disclosure, a ride-on vehicle is disclosed, the ride-on vehicle including a main chassis, the main chassis having a first pivot joint on a first side and a second pivot joint on a second side opposite the first pivot joint on the first side, a first sectioned rocker arm assembly having a front end portion and a rear end portion, wherein the rear end portion is separate from the front end portion and the first sectioned rocker arm assembly is pivotally coupled to the first pivot joint of the main chassis, and a second sectioned rocker arm assembly having a front end portion and a rear end portion, wherein the rear end portion is separate from the front end portion and the second sectioned rocker arm assembly is pivotally coupled to the second pivot joint of the main chassis. The ride-on vehicle further includes a first caster wheel rotatably coupled to the front end portion of the first sectioned rocker arm assembly, a second caster wheel rotatably coupled to the front end portion of the second sectioned rocker arm assembly, a first drive wheel rotatably coupled to the rear end portion of the first sectioned rocker arm assembly, and a second drive wheel rotatably coupled to the rear end portion of the second sectioned rocker arm assembly.

In accordance with another aspect of the disclosure, an outdoor power equipment device is disclosed, the outdoor power equipment device including a main chassis, the main chassis having a first pivot joint on a first side and a second pivot joint on a second side opposite the first pivot joint on the first side, a first rocker arm assembly pivotally coupled to the first pivot joint of the main chassis, as well as a second rocker arm assembly pivotally coupled to the second pivot joint of the main chassis. The outdoor power equipment device further includes a first front ground-contacting component coupled to a front end portion of the first rocker arm assembly, a second front ground-contacting component coupled to the front end portion of the second rocker arm assembly, a first drive wheel rotatably coupled to a rear end portion of the first rocker arm assembly, and a second drive wheel rotatably coupled to a rear end portion of the second rocker arm assembly.

BRIEF DESCRIPTION OF THE DRAWINGS

FIG. 3 is a rear perspective view of the zero turn radius lawnmower illustrated in

FIG. 1;

FIG. 5B is a rear perspective view of the zero turn radius lawnmower illustrated in

FIG. 1;

DETAILED DESCRIPTION

Figure 1:
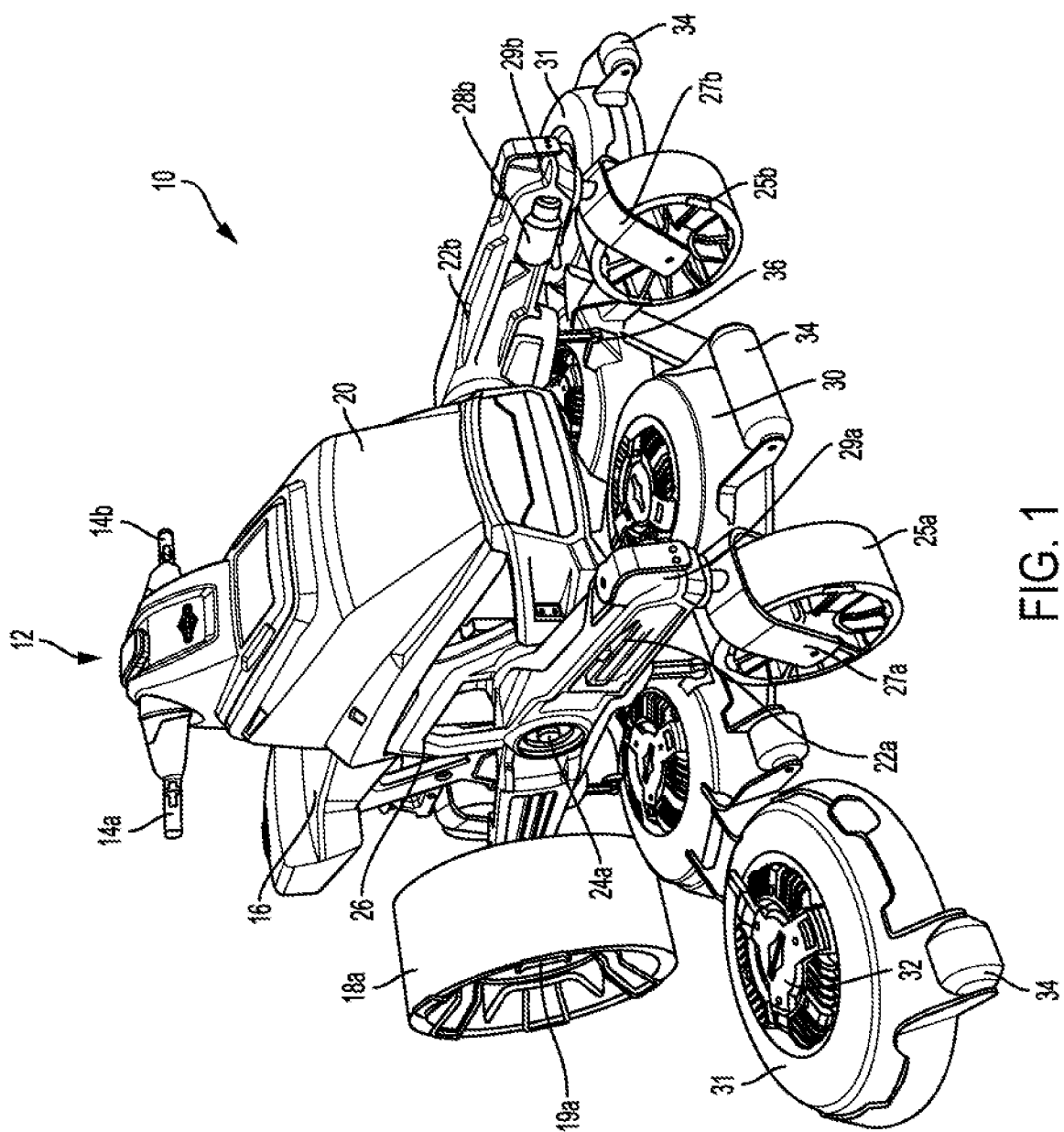
FIG. 1 is a front perspective view of a zero turn radius lawnmower in accordance with an aspect of the disclosure.

The following description is made for the purpose of illustrating the general principles of the present system and method and is not meant to limit the inventive concepts claimed in this document. Further, particular features described in this document can be used in combination with other described features in each of the various possible combinations and permutations.

Unless otherwise specifically defined in this document, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to". Additionally, use the term "couple", "coupled", or "coupled to" may imply that two or more elements may be directly connected or may be indirectly coupled through one or more intervening elements.

In this document, position-identifying terms such as "vertical", "horizontal", "front", "rear", "top", and "bottom" are not intended to limit the invention to a particular direction or orientation, but instead are only intended to denote relative positions, or positions corresponding to directions shown when a mower is oriented as shown in the Figures.

Referring to FIGS. 1-5B, outdoor power equipment and, specifically, a ride-on vehicle in the form of a zero turn radius lawnmower 10 is shown. Zero turn radius lawnmower 10 includes a control console 12 having a pair of control handles 14a, 14b extending from a main chassis 26. An operator seat 16 also extends from main chassis 26, with seat 16 configured as a saddle-type base over which the operator's legs may straddle during operation of the zero turn radius lawnmower 10. As shown in FIG. 5A, a pair of foot platforms 50a, 50b located on opposite sides of seat 16 provide a stable location for the operator's feet as they straddle seat 16. Accordingly, the operator is positioned on zero turn radius lawnmower 10 in a manner similar to that of a motorcycle, snowmobile, personal watercraft, etc. With this positioning, the operator's body weight is not solely supported by seat 16, but may also be at least partially supported by foot platforms 50a, 50b and/or control handles 14a, 14b. Furthermore, such a seat configuration may allow for the operator to shift their weight and overall body positioning dependent upon the terrain over which zero turn radius lawnmower 10 travels, thereby providing for a more ergonomic and comfortable experience for the operator over long periods of time and/or over varied terrain.

Zero turn lawnmower 10 further includes a pair of rear drive wheels 18a, 18b, with each drive wheel 18a, 18b capable of being independently driven by a respective wheel motor 19a, 19b in both forward and reverse directions. While wheel motors 19a, 19b are shown in FIGS. 1-5 as being hub motors located central to the rotational axis of drive wheels 18a, 18b, it is to be understood that other electric drive motor configurations are also possible and are within the scope of this disclosure. Furthermore, while not shown, wheel motors 19a, 19b may be powered by a single, centralized power source, such as one or more lithium ion batteries stored on or within a given location of main chassis 26. The power source may be removable, rechargeable, and/or replaceable. In such a configuration, power transmission wires may travel between the wheel motors 19a, 19b and the centralized power source either externally (i.e., upon surfaces of the various structural components of zero turn radius lawnmower 10) and/or internally (i.e., within the various structural components of zero turn radius lawnmower 10). Alternatively, instead of a single, centralized power source, each wheel motor 19a, 19b may have a dedicated power source. Furthermore, power sources other than a battery may be utilized, such as a fuel cell, natural gas-powered generator, etc. Additionally, in another embodiment, the drive wheels 18a, 18b may be powered by hydraulic wheel motors powered by an internal combustion engine placed on or within the main chassis 26.

Each of rear drive wheels 18a, 18b is rotatably coupled to a first end portion of a respective rocker arm 22a, 22b, with each rocker arm 22a, 22b configured to independently pivot relative to main chassis 26 along a respective pivot joint 24a, 24b. Coupled at a second end portion of each rocker arm 22a, 22b is a respective front caster assembly 27a, 27b having front caster wheel 25a, 25b, which may be configured to freely rotate 360° about respective caster pivot axes 29a, 29b to allow for zero turn radius maneuvering of zero turn radius lawnmower 10. Additionally and/or alternatively, a pair of motors 28a, 28b may be housed within the second end portion of each respective rocker arm 22a, 22b, with each motor 28a, 28b configured to selectively maintain front caster wheels 25a, 25b in a fixed position, thereby preventing front caster wheels 25a, 25b from freely rotating 360° about respective caster pivot axes 29a, 29b. Motors 28a, 28b may be activated to restrict rotation of front caster wheels 25a, 25b when, for example, zero turn radius lawnmower 10 is being operated across the side of a hill. In such an operating scenario, freely rotating caster wheels on the front of a zero turn radius lawnmower may be urged to turn in a downhill direction due to the weight on the front of the mower, thereby causing the front end of the mower to drift in a downhill direction, which necessitates a reactive operator "steering" input to the rear drive wheels to maintain an intended heading across the side of the hill. However, with motors 28a, 28b capable of selectively maintaining front caster wheels 25a, 25b in a fixed position, the front caster wheels 25a, 25b will not be urged to turn in a downhill direction, thereby helping to maintain the mower in the intended heading. Activation of motors 28a, 28b to fix and/or steer caster wheels 25a, 25b in a particular position may be done manually by the operator (e.g., via a button on the control console 12) or automatically (e.g., via one or more gyroscopic sensors, accelerometers, etc.).

As is illustrated in FIGS. 1-5A, rocker arms 22*a*, 22*b* are each configured as single, direct linkage between respective rear drive wheels 18*a*, 18*b* and front caster wheels 25*a*, 25*b*, with rear drive wheels 18*a*, 18*b* and front caster wheels 25*a*, 25*b* related in partial rotation about a single respective pivot joint 24*a*, 24*b*. Such a configuration may be considered a modified "rocker bogie" suspension arrangement, which utilizes a pair of independently-pivotable rocker arms on either side of a chassis that allow the chassis to maintain an average pitch angle of both rocker arms as the vehicle travels over varying terrain. With this configuration, any ground input experienced by one of the linked wheels causes a substantially opposite reaction by the other of the linked wheels. For example, if front caster wheel 25*a* travels through a dip in the ground surface, rocker arm 22*a* partially rotates about pivot joint 24*b*, thereby causing relative movement of rear drive wheel 18*a*. As rocker arm 22*b* is independent from rocker arm 22*a*, rocker arm 22*b* does not necessarily rotate in concert with rocker arm 22*a*, but may itself react independently to changes in terrain. In this way, main chassis 26 (and, thus, the operator aboard seat 16) follows the inputs of both rear drive wheels 18*a*, 18*b* and front caster wheels 25*a*, 25*b* to provide for a smooth operating experience, even over rough and/or undulating terrain. Alternatively, while not shown in FIGS. 1-5A, in accordance with another embodiment, each of the rocker arms may be divided into two sections, with one section supporting the front caster wheel and the other section supporting the rear drive wheel. Each section of the rocker arm may be configured to be separately pivotable about a respective pivot joint located proximate to a central pivot joint (such as pivot joint 24*a*, 24*b*). With such a configuration, each portion of the rocker arm may also be coupled to a respective shock absorber (e.g., a coil-over-shock device), thereby providing additional dampening as the zero turn radius lawnmower 10 travels over rough, uneven terrain.

Figure 2:
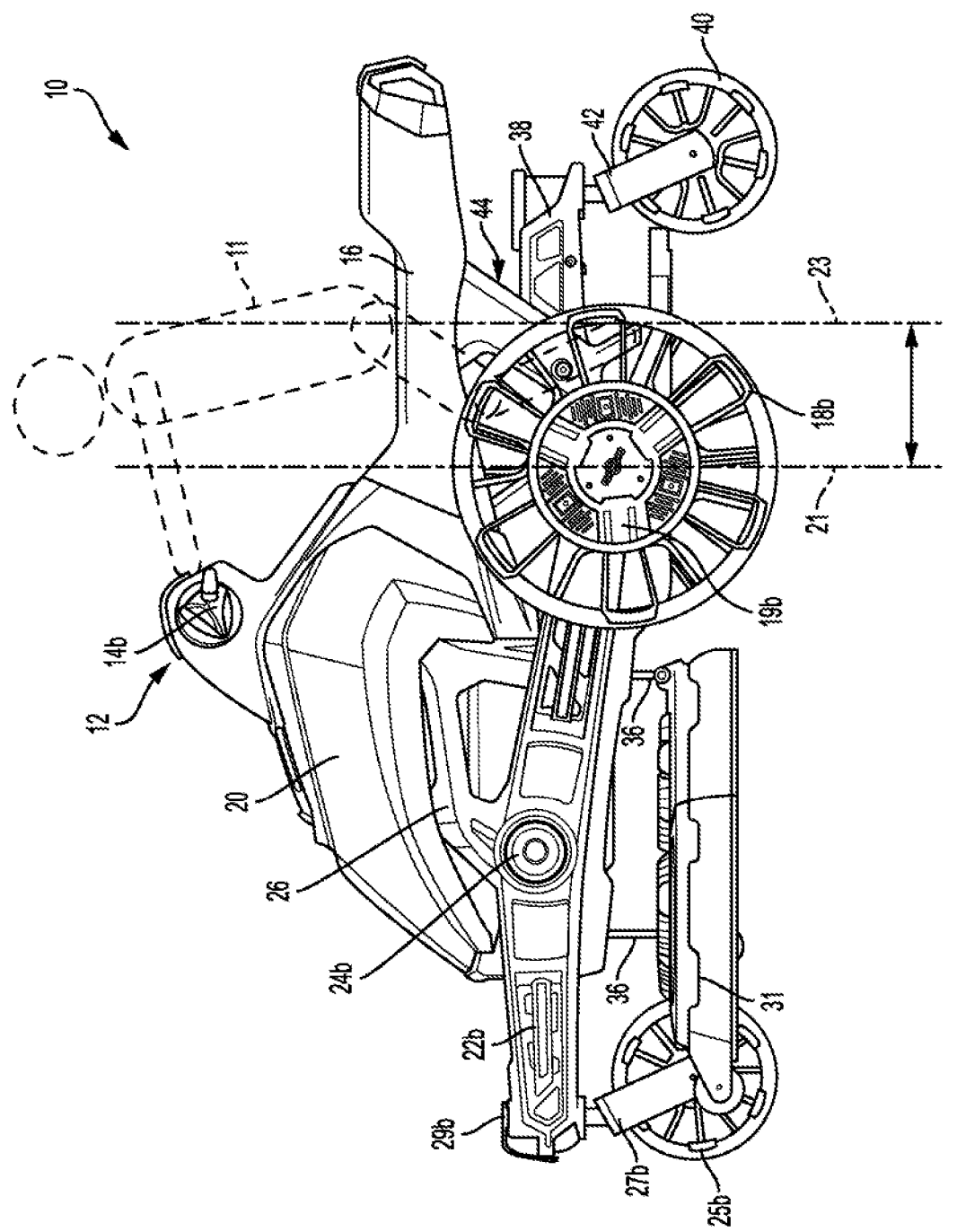
FIG. 2 is a side view of the zero turn radius lawnmower illustrated in FIG. 1.
Figure 3:
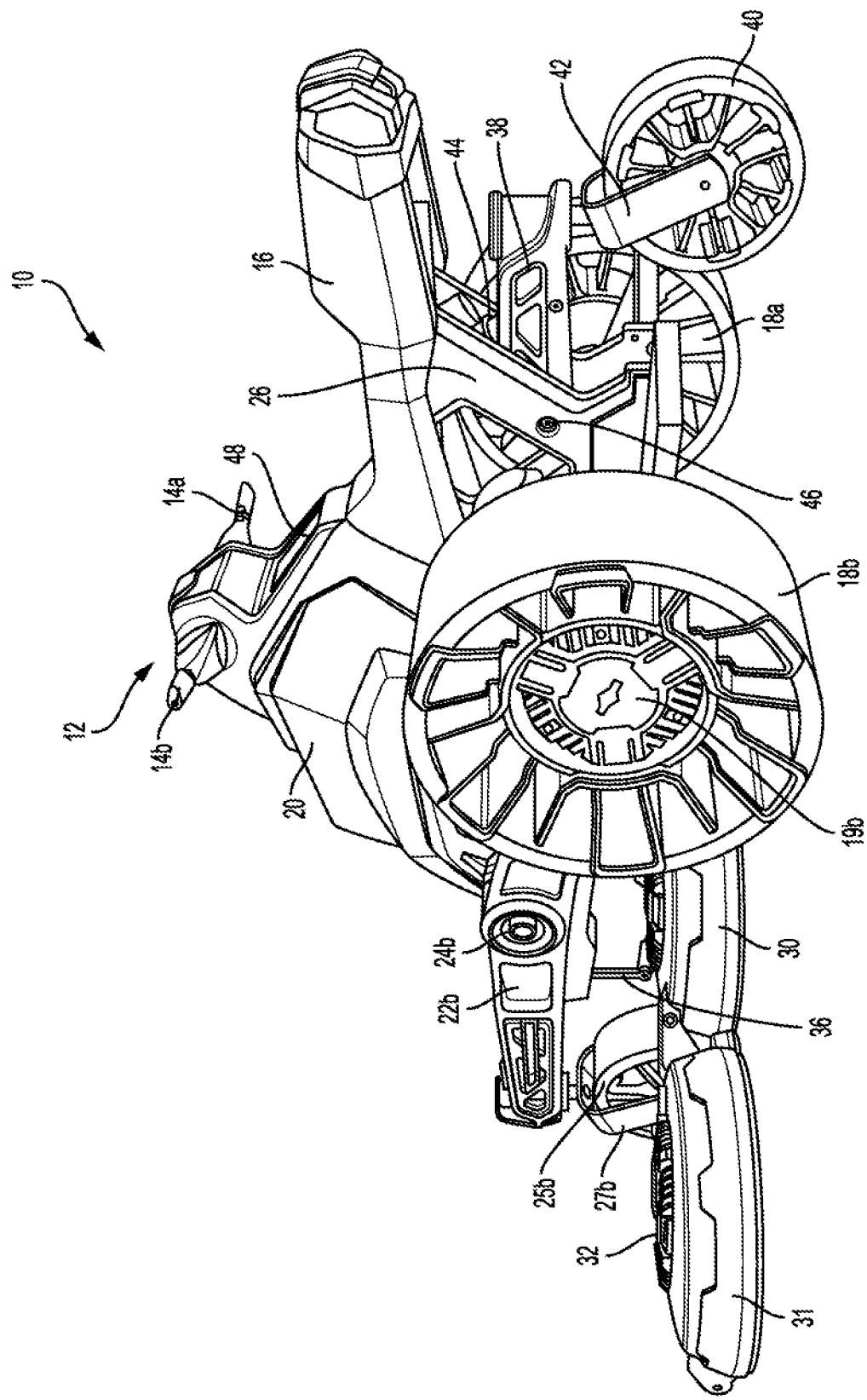
Figure 4:
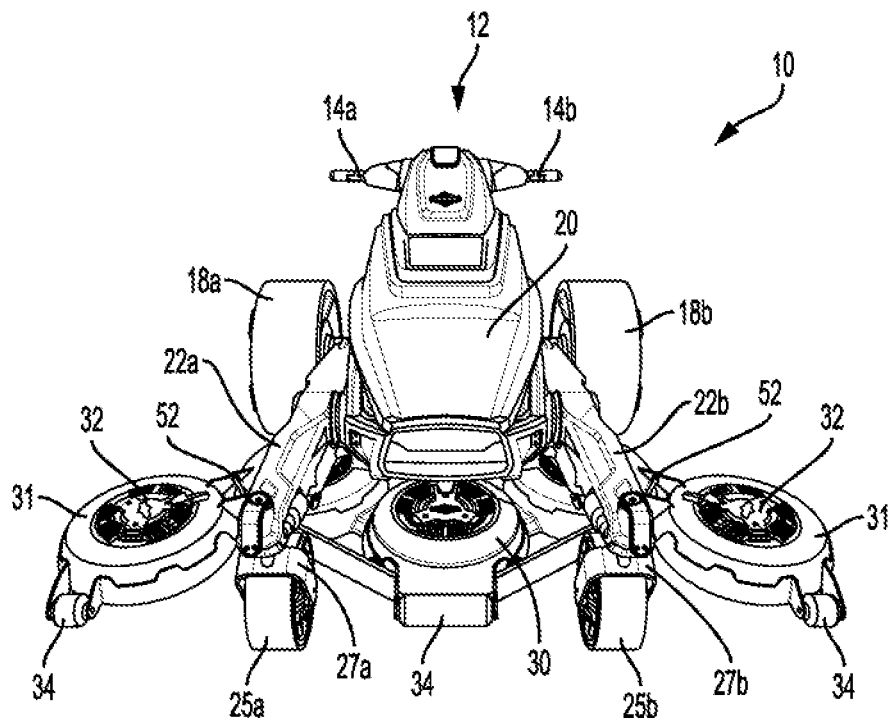
FIG. 4 is a front view of the zero turn radius lawnmower illustrated in FIG. 1.
Figure 5A:
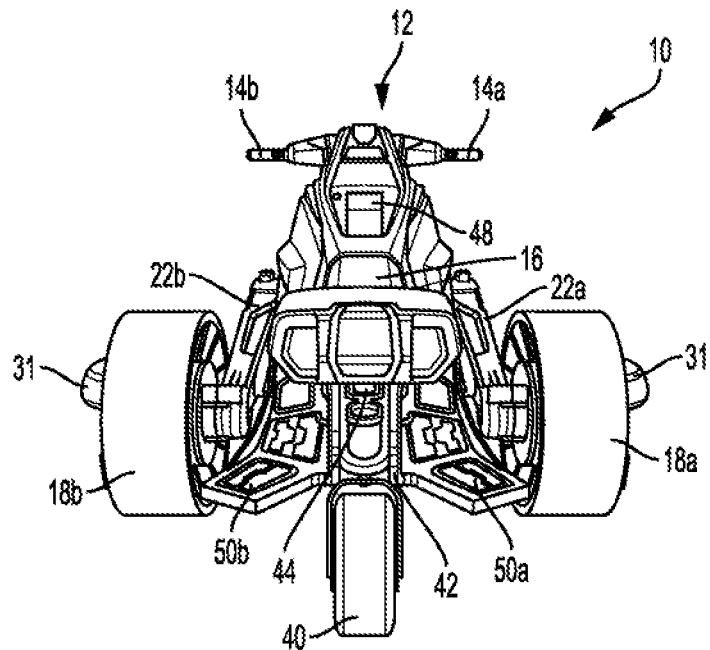
FIG. 5A is a rear view of the zero turn radius lawnmower illustrated in FIG. 1.

Referring to FIGS. 2, 3, and 5A, zero turn radius lawnmower 10 may also include a rear caster wheel 40 located to the rear of respective drive wheels 18*a*, 18*b*. Rear caster wheel 40 may be carried by a suspended linkage 38, which is vertically pivotable about main chassis 26 along a pivot joint 46. A caster assembly 42 may be rotatably coupled at one end portion of suspended linkage 38 to carry caster wheel 40 and allow caster wheel 40 to freely rotate 360°. The other end portion of suspended linkage 38 may be coupled to a suspension device 44, such as, for example, a coil-over-shock device, which is also coupled to main chassis 26. In this configuration, rear caster wheel 40 acts to support the rear portion of zero turn radius lawnmower 10 without compromising the maneuverability and zero turn radius functionality of the mower. Additionally, because linkage 38 is coupled to main chassis 26 through a suspension device 44, vertical forces input at caster wheel 40 are dampened, thereby providing a more comfortable ride for the operator.

While not illustrated, in accordance with another embodiment, rear caster wheel 40 and its associated components may be omitted from zero turn radius lawnmower 10. In such a configuration, one or both of pivot joints 24*a*, 24*b* may include an active motor or other device configured to maintain main chassis 26 substantially parallel to the operating surface, even with an operator on seat 16. One or more sensors on or within the zero turn radius lawnmower 10 may provide inputs to a controller onboard the lawnmower 10, which can then control the active motor(s) to level the main chassis 26. Additionally and/or alternatively, one or more mechanical means of providing leveling support (such as, for example, mechanical differential gears) may be provided in relation to the pivot joints 24*a*, 24*b* and the main chassis 26.

As noted above, zero turn radius lawnmower 10 is configured such that the operator's body weight is not solely supported by seat 16, but may also be at least partially supported by foot platforms 50*a*, 50*b* and/or control handles 14*a*, 14*b*. This may allow the operator to shift their body weight when travelling up, down, and across uneven terrain, thereby changing the center of gravity of the zero turn radius lawnmower 10 and providing increased stability and traction. Additionally, zero turn radius lawnmower 10 is also configured such that much of the operator's body weight, when positioned on seat 16, is located behind the centerline radial axis of the rear drive wheels 18*a*, 18*b*. For example, referring to FIG. 2, an operator 11 is shown as positioned on seat 16 along a seated centerline axis 23, which is spaced apart from (and to the rear of) a radial centerline axis 21 of the rear drive wheels 18*a*, 18*b*. With this positioning, vertical forces imparted on the rear drive wheels 18*a*, 18*b* by, for example, bumps, divots, curbs, etc. are not transferred directly to the centerline axis of the operator's seated position. Thus, not only is the operator able to naturally dampen impacts by the shifting of body weight to foot platforms 50*a*, 50*b*, seat 16, and/or control handles 14*a*, 14*b*, but the vertical forces seen at seat 16 are reduced based on the forward location of rear drive wheels 18*a*, 18*b* relative to the operator's position.

Figure 5B:
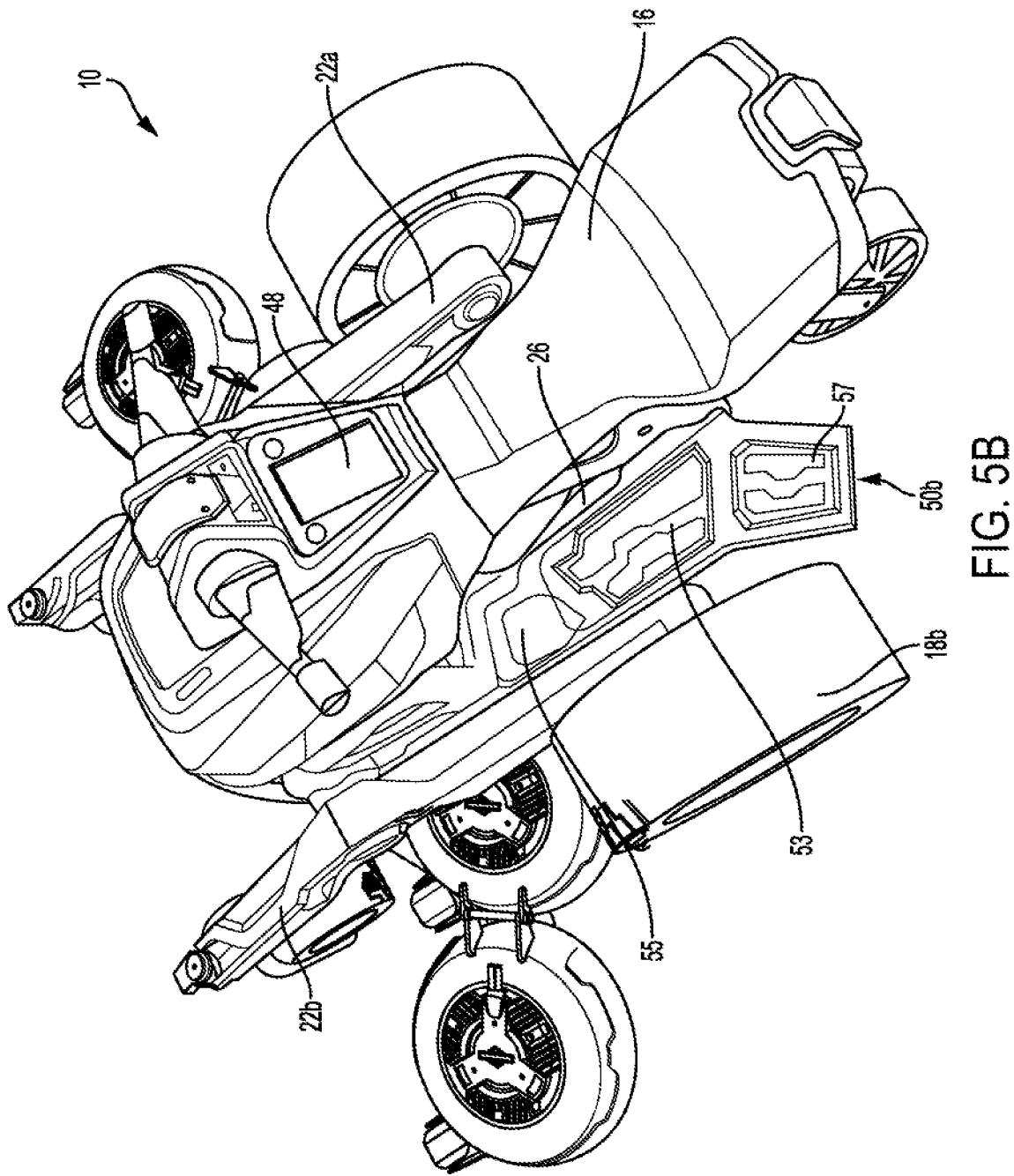

As illustrated in FIG. 5B, foot platform 50*b* is configured to provide a large surface area upon which the operator my rest and/or place their left foot during operation of the zero turn lawnmower 10. While only foot platform 50*b* is illustrated in FIG. 5B, it is to be understood that opposing foot platform 50*a* is similarly constructed. Foot platform 50*b* may be configured to occupy a substantial amount of space between the rocker arm 22*b* and the main chassis 26, providing the operator with a variety of foot placement options. Additionally, foot platform 50*b* (and, similarly, foot platform 50*a*) may be configured to have varying angular orientations along its length to provide the operator with multiple options for foot placement. For example, as shown in FIG. 5B, a central portion 53 of foot platform 50*b* may be a surface that remains substantially level with main chassis 26, thereby providing the operator with a stable platform on which to stand and/or otherwise support their weight during operation of the zero turn radius lawnmower 10. However, a front portion 55 of foot platform 50*b* may be angled slightly upward relative to central portion 53 so as to provide the user with an ergonomically-pleasing foot rest when the operator is seated on seat 16. Furthermore, foot platform may have a rear portion 57, which is angled laterally outward away from seat 16. Rear portion 57 may provide the operator with an accessible platform between rear drive wheel 18*b* and seat 16 upon which to step when mounting and/or dismounting the seat 16 of zero turn radius lawnmower 10. In this way, the operator would not need to step onto any other portion of the zero turn radius lawnmower 10 (e.g., the mower deck, drive wheel, etc.) in order to effectively access the seat 16.

Figure 11A:
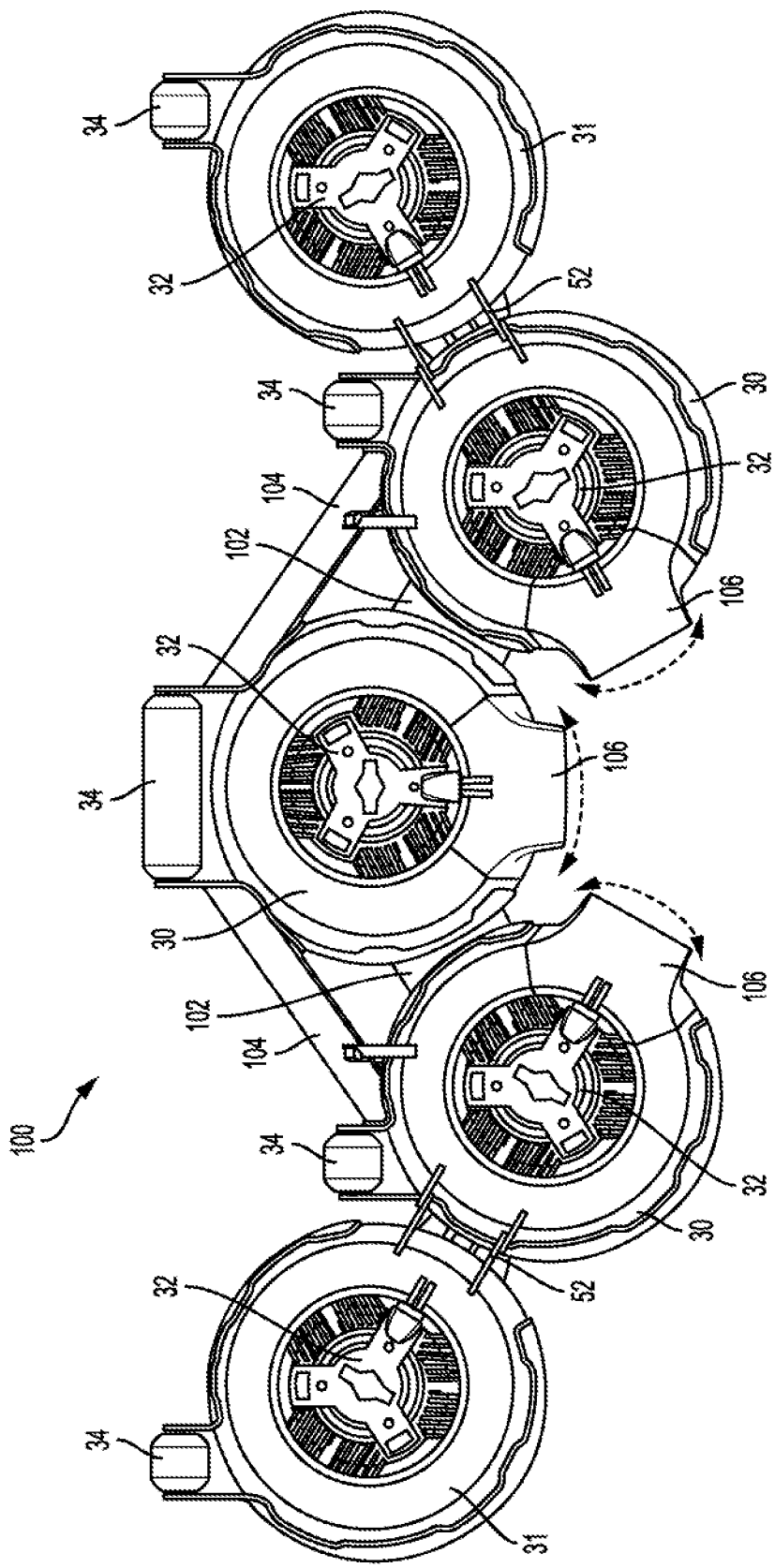
FIG. 11A is a top view of a mower deck configuration for a zero turn radius lawnmower in accordance with an aspect of the disclosure.
Figure 11B:
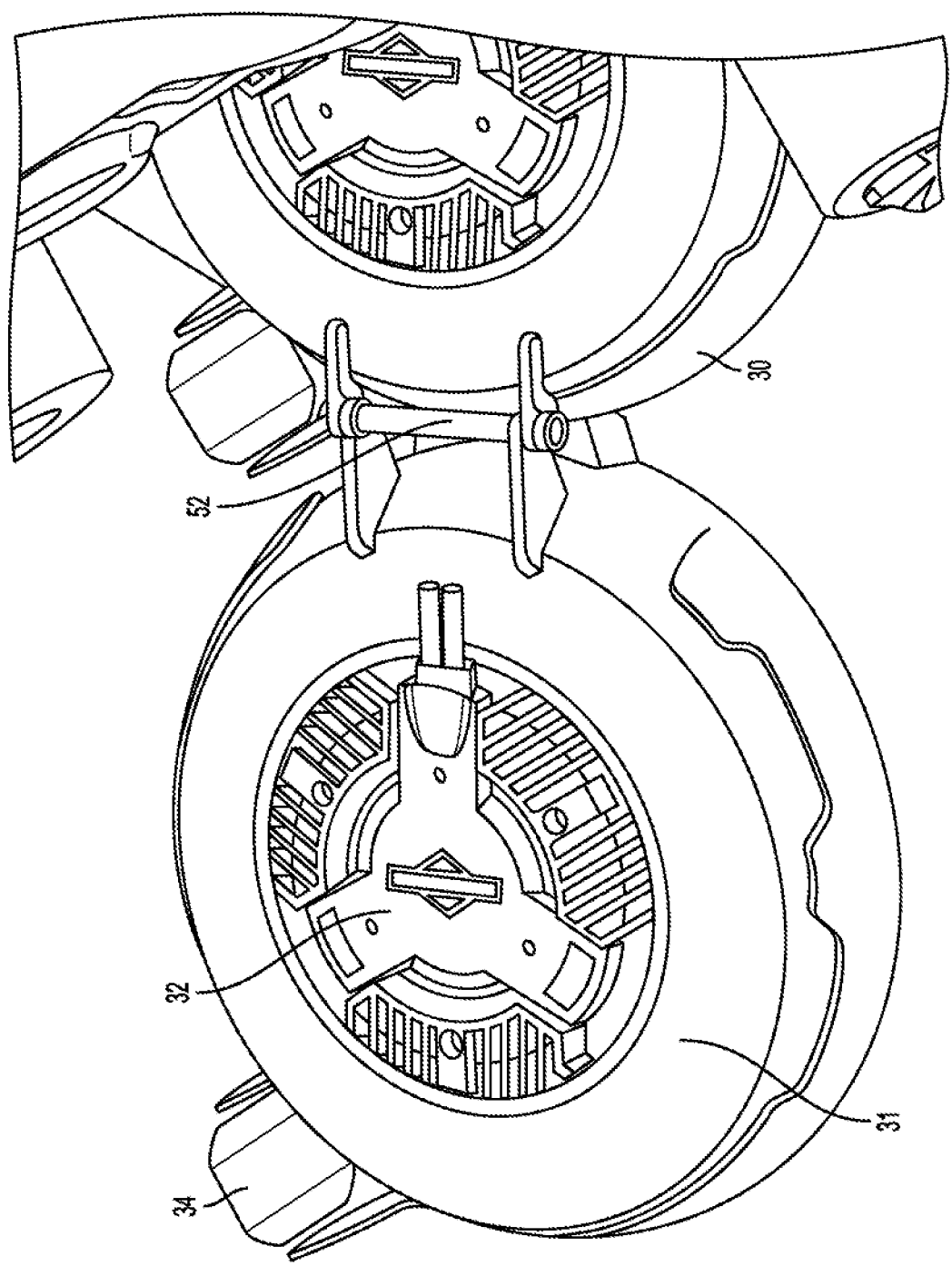
FIG. 11B is a detailed perspective view of an auxiliary mower deck module coupling in accordance with an aspect of the disclosure.

Referring again to FIGS. 1-5A, and also to FIGS. 11A-11B, zero turn radius lawnmower 10 further includes a mower deck assembly 100, which includes a plurality of mower deck modules 30, 31 suspended below main chassis 26 and between rear drive wheels 18*a*, 18*b* and front caster wheels 25*a*, 25*b*. In one embodiment, three central mower deck modules 30 are joined together via couplings 102 and reinforcement bars 104, as shown in FIG. 11, while a pair of outer mower deck modules 31 are joined to the central mower deck modules 30 via articulating joints 52. A plurality of rollers 34 of various sizes may be provided across the mower deck modules 30, 31 so as to allow the mower deck assembly 100 to follow the ground when lowered to a cutting position. Each mower deck module 30, 31 may include a dedicated electric blade motor 32, each of which is configured to provide rotation for each blade within deck modules 30, 31. Electric blade motors 32 may be powered by central power source (e.g., one or more lithium ion batteries stored on or within main chassis 26), or the motors 32 may have individual or shared power sources located elsewhere on zero turn radius lawnmower 10. Electrical wiring from the one or more power sources may run directly to each of the blade motors 32, for example, across the top of mower deck assembly 100. Alternatively, electrical power from a central power source may run to only one of the blade motors 32 via electrical wires, with electrical power then delivered to the other blade motors 32 the mower deck assembly 100 via another means, such as conductively through a portion of each deck module 30, 31.

As noted above, and as shown in greater detail in FIG. 11B, outer mower deck modules 31 may be configured to be coupled to central mower deck modules 30 via respective articulating joints 52. Articulating joints 52 allow outer mower deck modules 31 to pivot relative to central mower deck modules 30, thereby enabling at least a portion of mower deck assembly 100 to articulate in order to follow variations and/or undulations in the ground surface. Articulating joints 52 may be formed, for example, by a hinge and pin configuration that allows outer mower deck modules 31 to pivot vertically with respect to central mower deck modules 30. As each blade of mower deck modules 30, 31 is powered by a dedicated motor 32, this articulation is possible, as allowing the rotational axes of the respective blades of the deck modules to become non-parallel during operation is feasible, as no drive belts and/or pulleys are needed to rotate each blade. Additionally and/or alternatively, one or more of the outer mower deck modules 31 may be removable from the central mower deck modules 30, thereby allowing the cutting width of mower deck assembly 100 to be customizable based on terrain, power, and/or maneuverability needs. Furthermore, one or more of the central mower deck modules 30 may also be coupled by articulating joints, thereby enabling the one or more mower deck modules 30, 31 to also articulate in order to follow variations and/or undulations in the ground surface.

As illustrated in FIGS. 1-3, mower deck modules 30, 31 are operably coupled to, and suspended from, rocker arms 22a, 22b via a plurality of linkages 36. As mower deck modules 30, 31 are suspended from rocker arms 22a, 22b as opposed to main chassis 26, pivotal movement of one or both of rocker arms 22a, 22b as the zero turn radius lawnmower 10 travels across the terrain allows the mower deck modules 30, 31 to follow suit. For example, if front caster wheel 25b were to move downward, so too would the front end of the mower deck modules 30, 31 linked nearby. In this way, the cut of vegetation across undulating terrain is able to remain substantially even, as the mower deck modules 30, 31 are better able to follow the contours of the ground.

Figure 6:
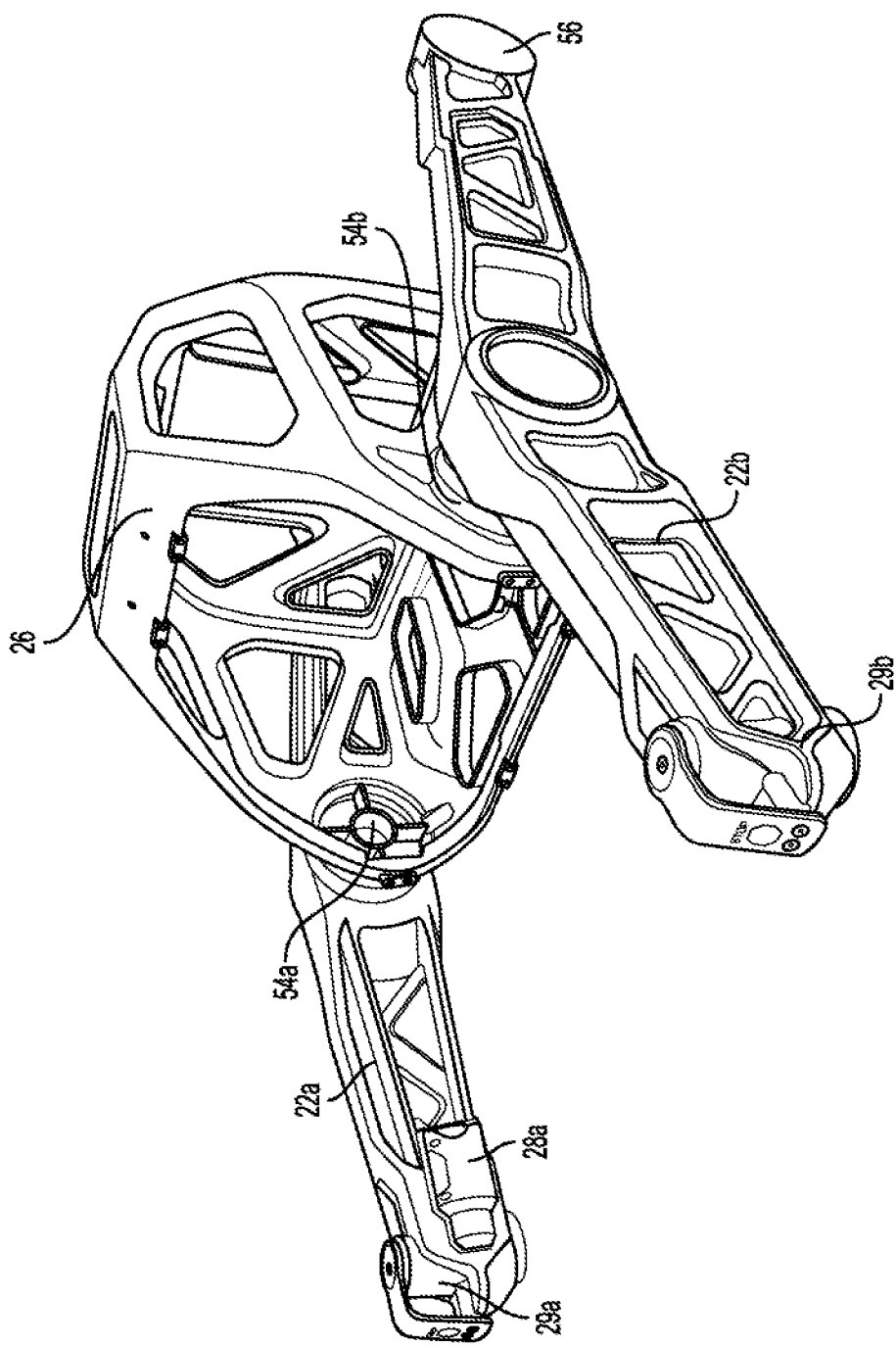
FIG. 6 is a front perspective view of a lawnmower chassis and rocker arm configuration in accordance with an aspect of the disclosure.

Referring now to FIG. 6, main chassis 26 and respective rocker arms 22a, 22b are shown in greater detail. Main chassis 26 may be formed of any appropriate material(s) and through any appropriate manufacturing process. For example, main chassis 26 may be formed as one or more cast aluminum frame structures, similar to the formation of an automobile frame structure. By forming main chassis 26 in this way, the overall structure is lightweight and relatively inexpensive to manufacture, yet maintains the quality and strength needed for frequent use. Additionally, by forming main chassis 26 of one or more cast aluminum frame structures, the interior portion of main chassis 26 provides an open space for the protected storage of a central power source, control electronics, etc. Additionally, because the frame structures are substantially open, cooling air is more readily available to the power source and/or electronics stored therein. As shown in FIGS. 1-5, one or more body panels 20 may be coupled to main chassis 26. As the one or more body panels 20 do not necessarily need to provide structural support for any portion of the zero turn radius lawnmower 10, the body panels 20 may be made of any material, such as plastic, fiberglass, aluminum, etc., and may be formed with various decorative features, such as decorative contours, inlays, etc.

Rocker arms 22a, 22b may also be formed of any appropriate material and through any appropriate manufacturing process, such as cast aluminum. As shown in FIG. 6, each respective rocker arm 22a, 22b is independently pivotally coupled to main chassis 26 at a respective pivot location 54a, 54b on main chassis 26. The length of rocker arms 22a, 22b may be chosen dependent upon the overall dimensions of the mower and/or mower deck. For example, the length of rocker arms 22a, 22b between caster pivot axes 29a, 29b and rear drive wheel pivot axis 56 may, in one embodiment, be dictated by the fore-to-aft dimensions of the mower deck suspended therefrom. For a superior cut quality, having the mower deck follow the movements of the front caster wheels and rear drive wheels as closely as possible is generally desirable. Therefore, to achieve such results, rocker arms 22a, 22b may be dimensioned so as to place the front caster wheels close to the front of the mower deck and the rear drive wheels close to the rear of the mower deck. Additionally and/or alternatively, rocker arms 22a, 22b may be dimensioned so as to optimize the dampening characteristics described above, and/or a desired footprint of the overall zero turn radius lawnmower 10.

Figure 7A:
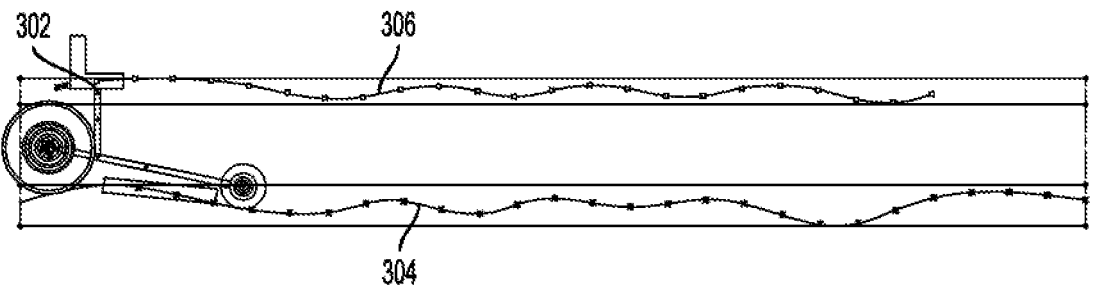
FIG. 7A is a graphical representation of ground input versus rider input for an unsuspended zero turn lawnmower in accordance with the prior art.

Referring to FIGS. 7A-7D, graphical representations of ground inputs versus operator-sensed inputs in accordance with various types of zero turn radius lawnmowers are shown. FIG. 7A illustrates a conventional, unsuspended ride-on zero turn radius lawnmower 302 travelling over a ground path represented by curve 304. As zero turn radius lawnmower 302 travels along the path represented by curve 304, the operator seated on the mower physically experiences at least some of the vertical displacement caused by undulations in the terrain. The conventional ride-on zero turn radius lawnmower 302 is generally capable of dampening this input felt by the operator by a certain amount, which is represented by curve 306 in FIG. 7A. As can be seen by curve 306, for the conventional ride-on zero turn radius lawnmower 302 analyzed in this example, operator input is reduced by about 38% as compared to the ground input represented by curve 304. Accordingly, the operator of the conventional zero turn lawnmower 302 experiences some, but not all, of the vertical displacement caused by undulations in the terrain. It is to be understood that the amount of reduction of vertical displacement may vary dependent upon the size and model of zero turn radius lawnmower.

Figure 7B:
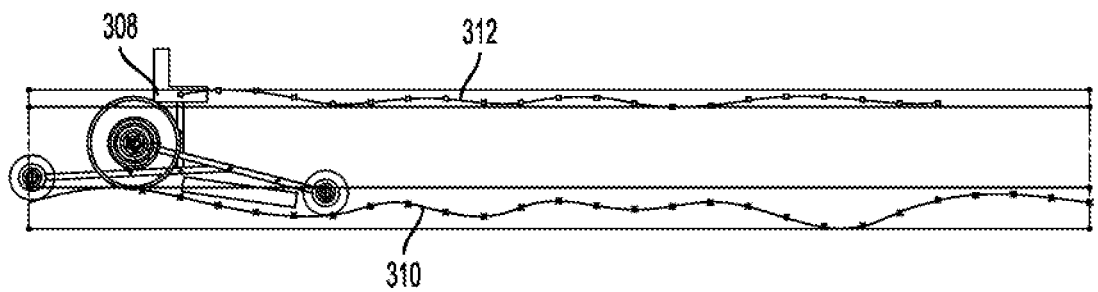
FIG. 7B is a graphical representation of ground input versus rider input for a zero turn lawnmower in accordance with an aspect of the disclosure.

On the other hand, FIG. 7B, illustrates a zero turn radius lawnmower 308 having a rocker arm configuration and rear caster wheel configuration similar to that shown and described above with respect to FIGS. 1-6. Again, as zero turn radius lawnmower 308 travels along the path represented by curve 310, the operator seated on the mower physically experiences at least some of the vertical displacement caused by undulations in the terrain. Due to the rocker arm and rear caster wheel configuration of zero turn radius lawnmower 308, the input felt by the operator, represented by curve 312, is reduced substantially more than the input felt by the operator of conventional zero turn radius lawnmower 302 described above. Specifically, operator input on zero turn radius lawnmower 308 is reduced by about 65% as compared to the ground input represented by curve 310. Accordingly, due to a rocker arm and rear caster wheel configuration such as that described above with respect to FIGS. 1-6, the operator of the zero turn lawnmower 308 experiences substantially less of the vertical displacement caused by undulations in the terrain, providing for greater operator comfort.

Figure 7C:
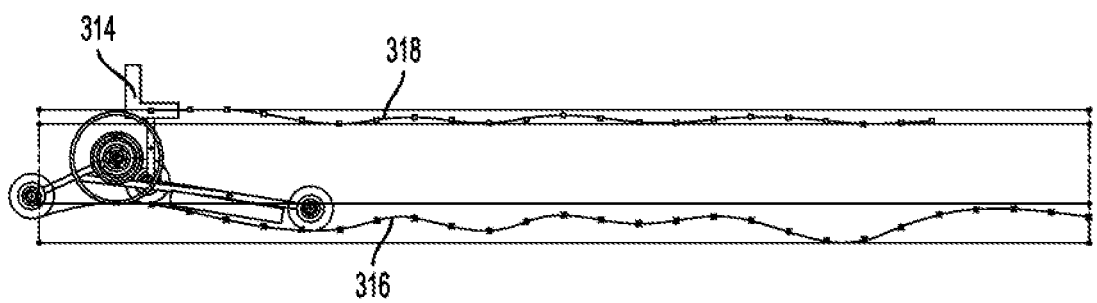
FIG. 7C is a graphical representation of ground input versus rider input for a zero turn lawnmower in accordance with another aspect of the disclosure.

FIG. 7C illustrates a zero turn radius lawnmower 314 in accordance with another embodiment. Zero turn radius lawnmower 314, like zero turn radius lawnmower 308 described above with respect to FIG. 7B, includes a rear caster wheel configuration. However, rather than having a single rocker arm configuration such as that shown in FIG. 7B, zero turn radius lawnmower 314 is configured to have a "double rocker" configuration, with dual pivoting rocker arms disposed on either side of a main chassis. Due to this dual rocker arm and rear caster wheel configuration, the input felt by the operator of zero turn radius lawnmower 314, represented by curve 318, is even more reduced than the input felt by the operator of conventional zero turn radius lawnmower 302 described above. Specifically, operator input on zero turn radius lawnmower 314 is reduced by about 75% as compared to the ground input represented by curve 316. Accordingly, with a modified, dual rocker arm and rear caster wheel configuration, a zero turn lawnmower may be configured such that the operator experiences even less of the vertical displacement caused by undulations in the terrain.

Figure 7D:
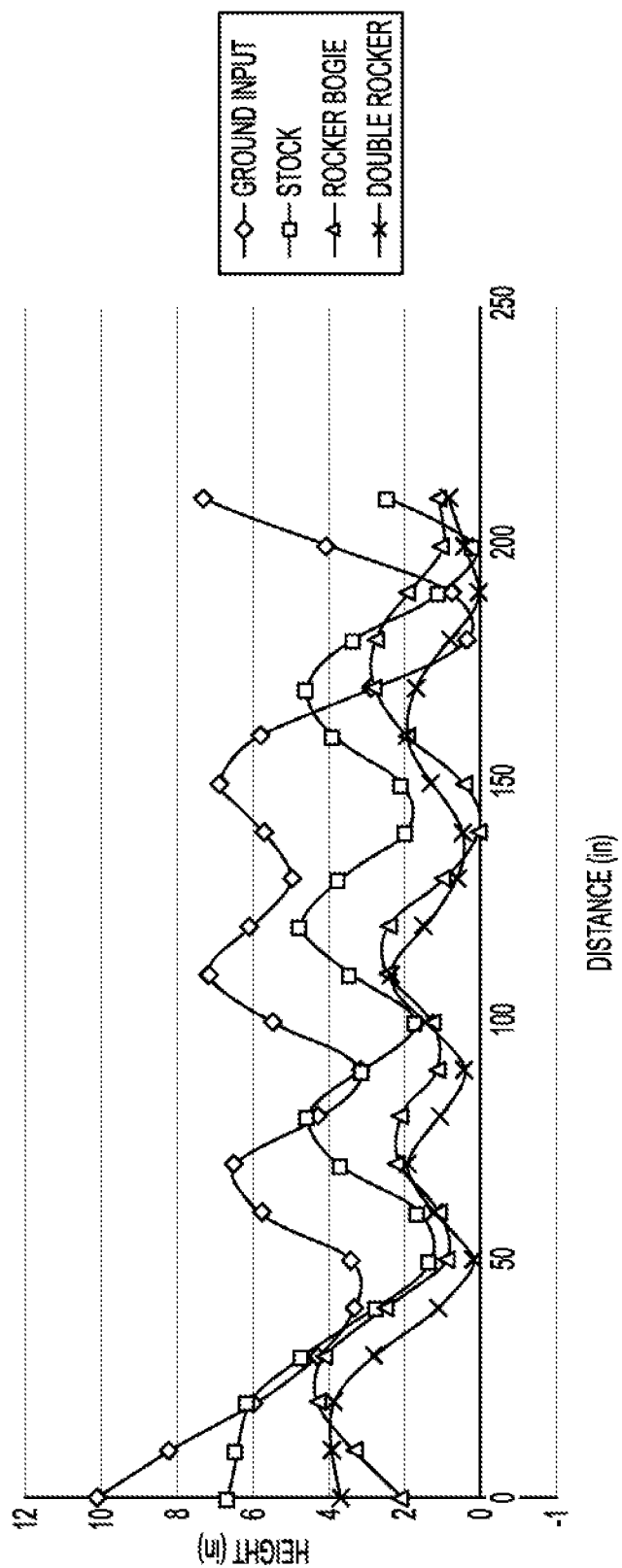
FIG. 7D is a graphical representation of vertical ground input versus vertical rider input over a given distance in accordance with an aspect of the disclosure.

Referring to FIG. 7D, a graph illustrating the variations in vertical displacement over a certain length of ground for a "stock" lawnmower (FIG. 7A), a "rocker bogie" lawnmower (FIG. 7B), and a "double rocker" lawnmower (FIG. 7C) is shown. As is clear from the graph of FIG. 7D, both the "rocker bogie" and "double rocker" zero turn radius lawnmower configurations provide for substantially reduced operator input over a highly undulating path.

Figure 8B:
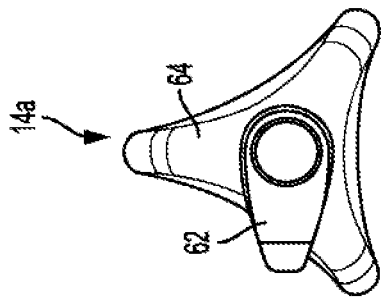
FIG. 8B is a side view of the steering and drive control configuration illustrated in FIG. 8A.
Figure 8A:
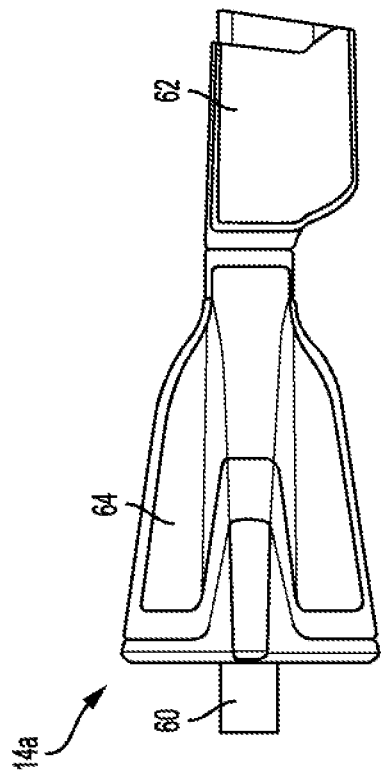
FIG. 8A is a top view of a steering and drive control configuration for a zero turn radius lawnmower in accordance with an aspect of the disclosure.
Figure 8C:
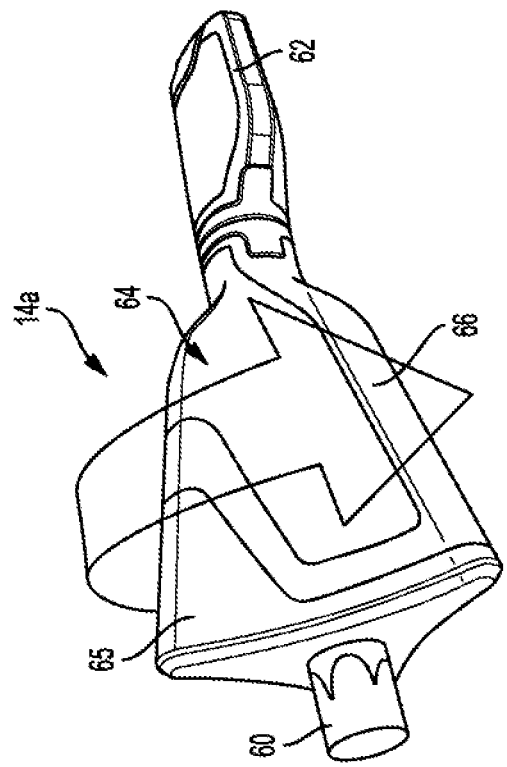
FIG. 8C is a perspective view of the steering and drive control configuration illustrated in FIG. 8A.

As noted above with respect to FIGS. 1-5A, the control handles 14a, 14b may be configured to at least selectively support portions of the operator's weight as the zero turn radius lawnmower travels over uneven terrain, which is not possible with the steering levers of conventional ride-on zero turn radius lawnmowers. In order to achieve this functionality, control handles 14a, 14b are at least partially restricted from rotation and/or articulation relative to control console 12. Specifically, one embodiment of control handles 14a, 14b is illustrated in FIGS. 8A-8C. For ease of illustration, only a single control handle 14a is shown in FIGS. 8A-8C, but it is to be understood that control handle 14b is similarly configured. Control handle 14a includes a central shaft 60, which is coupled to the control console 12 (not shown). Rigidly affixed to central shaft 60 is a hand grip portion 62, which provides an ergonomically-pleasing surface upon which the operator may grip and rest their hand. Hand grip portion 62 is restricted from rotation about central shaft 60, thereby providing a solid surface upon which the operator may push, pull, or otherwise distribute their weight during operation of the zero turn radius lawnmower.

To the inside of control handle 14a (i.e., in the direction of control console 12) is a rotatable control paddle 64. Control paddle 64 is configured to be at least partially rotatable about central shaft 60, and is configured to provide inputs used to drive the rear drive wheels 18a, 18b in both forward and reverse directions to control the drive and steering of the zero turn radius lawnmower 10. For example, the operator may use their thumb to rotate control paddle 64 forward relative to operator, which may act to drive one of the rear drive wheels (e.g., drive wheel 18a) in a forward direction. Conversely, the operator may use their thumb to rotate paddle rearward relative to the operator (as depicted by the arrow in FIG. 8C), thereby causing one of the rear wheels to move in a reverse direction. For comfort and/or effectiveness, the control paddle 64 may have a grip surface 66, enabling the operator's thumb to avoid slipping during operation, as well as various non-grip surfaces 65.

With the configuration shown in FIGS. 8A-8C, the operator is able to utilize control handles 14a, 14b to provide at least some weight support during operation of zero turn radius lawnmower 10, as only control paddle 64 is rotatable. For example, as the zero turn radius lawnmower 10 moves over rough, uneven terrain, the operator may opt to stand on foot platforms 50a, 50b to allow their legs to provide additional shock absorption, while also pushing and/or pulling on portions of control handles 14a, 14b to provide some weight support and stability across the terrain. Conventional zero turn radius lawnmower control levers do not allow for such weight support on the controls, as pushing and/or pulling forces on the control levers would cause the lawnmower to move forward, backward, or turn undesirably.

Figure 9:
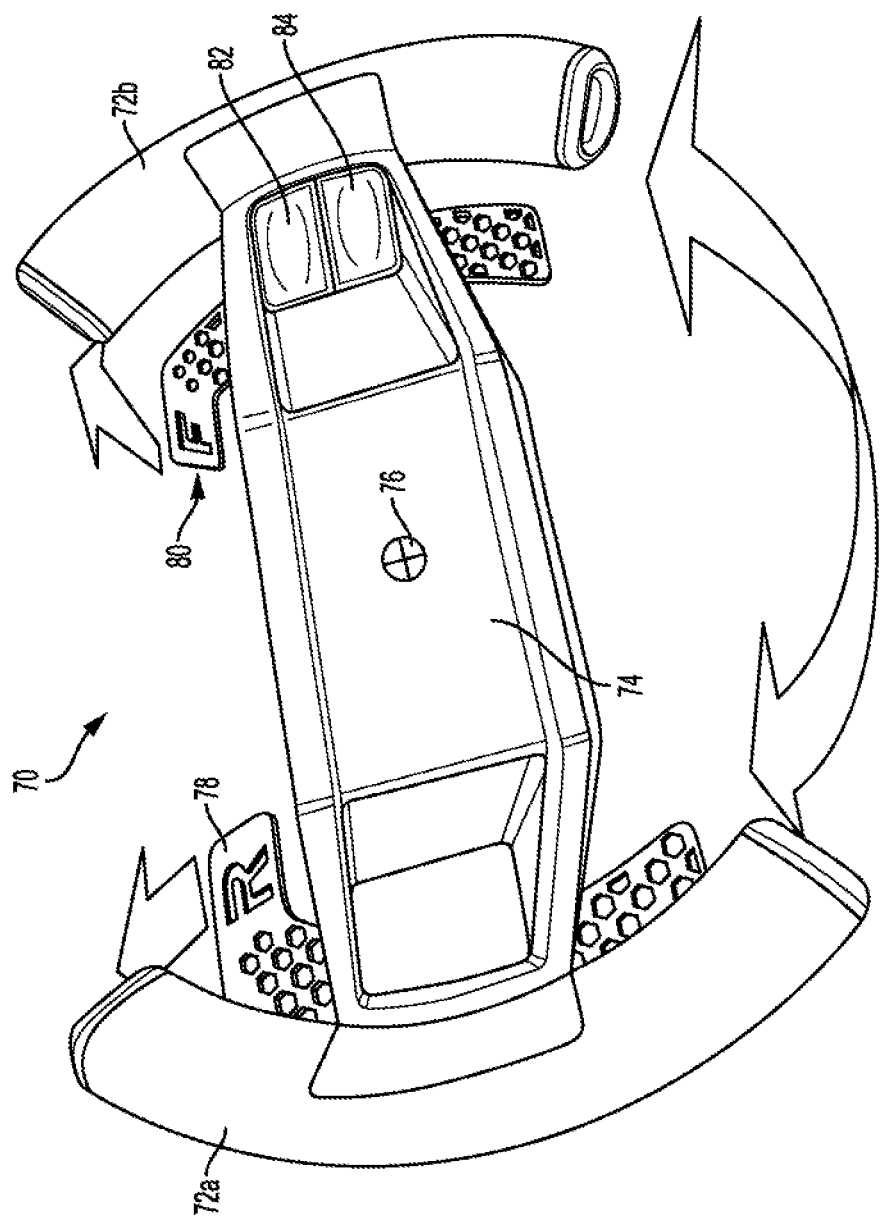
FIG. 9 is a perspective view of a steering and drive control configuration for a zero turn radius lawnmower in accordance with another aspect of the disclosure.

Referring now to FIG. 9, a control assembly 70 in accordance with another aspect of the disclosure is illustrated. Unlike control handles 14a, 14b described above, control assembly 70 provides a steering wheel-like turning control for a zero turn radius lawnmower. Control assembly 70 includes a pair of opposing hand grip portions 72a, 72b, which are connected by a central console portion 74. The control assembly 70 may be at least partially rotated about a central axis 76 in order to allow the operator to control the steering of the zero turn radius lawnmower. Varying degrees of rotation of control assembly 70 in either direction may result in varying turning results. For example, incremental rotation of control assembly 70 up to, for example, ±25°, may provide for corresponding incremental turning of the zero turn radius lawnmower as it tracks in a forward or reverse direction. However, rotation of control assembly 70 from, e.g., ±25° to about ±30° may result in half of a zero radius turn (e.g., a 90° turn), while rotation of control assembly 70 at or above ±30° may result in the lawnmower turning over a full zero turn radius (e.g., 180° or more) from its current position. In order to restrict or prevent high-speed zero turn radius turning, the wheel motors (such as wheel motors 19a, 19b described above with respect to FIGS. 1-5A) may be configured to be speed sensitive. That is, at operational speeds at or above a predetermined maximum zero turn radius speed (e.g., 10 MPH), wheel motors 19a, 19b may restrict the lawnmower from performing a full or partial zero turn radius turn and only allow incremental changes in lawnmower heading. Once the lawnmower has been slowed to a speed below the predetermined maximum zero turn radius speed, the wheel motors 19a, 19b may allow the full zero turn radius functionality.

In order to control forward and reverse movement of the zero turn radius lawnmower, a respective forward paddle 80 and reverse paddle 78 may be provided in proximity to opposing hand grip portions 72a, 72b. The operator may use one or more fingers to operate forward paddle 80 and reverse paddle 78, with the speed of the lawnmower in either direction (as well as the speed at which turns are performed) dictated by the degree in which each respective paddle 78, 80 is pulled toward the operator. Additionally and/or alternatively, control assembly 70 may incorporate a cruise control button 82, which enables the operator to set a preferred speed of operation without the need to maintain a constant force on either paddle 78, 80. The cruise control operation may then be cancelled by activation of cancel button 84, at which time operator control of the zero turn lawnmower's speed must be dictated through manipulation of one of paddles 78, 80.

While control assembly 70 is configured to at least partially rotate about central axis 76, the operator may still utilize control assembly 70 to at least partially support their weight during operation of the zero turn radius lawnmower. Accordingly, the operator's weight may be supported by foot platforms, a seat, and/or control assembly 70, as opposed to only a seat.

Figure 10:
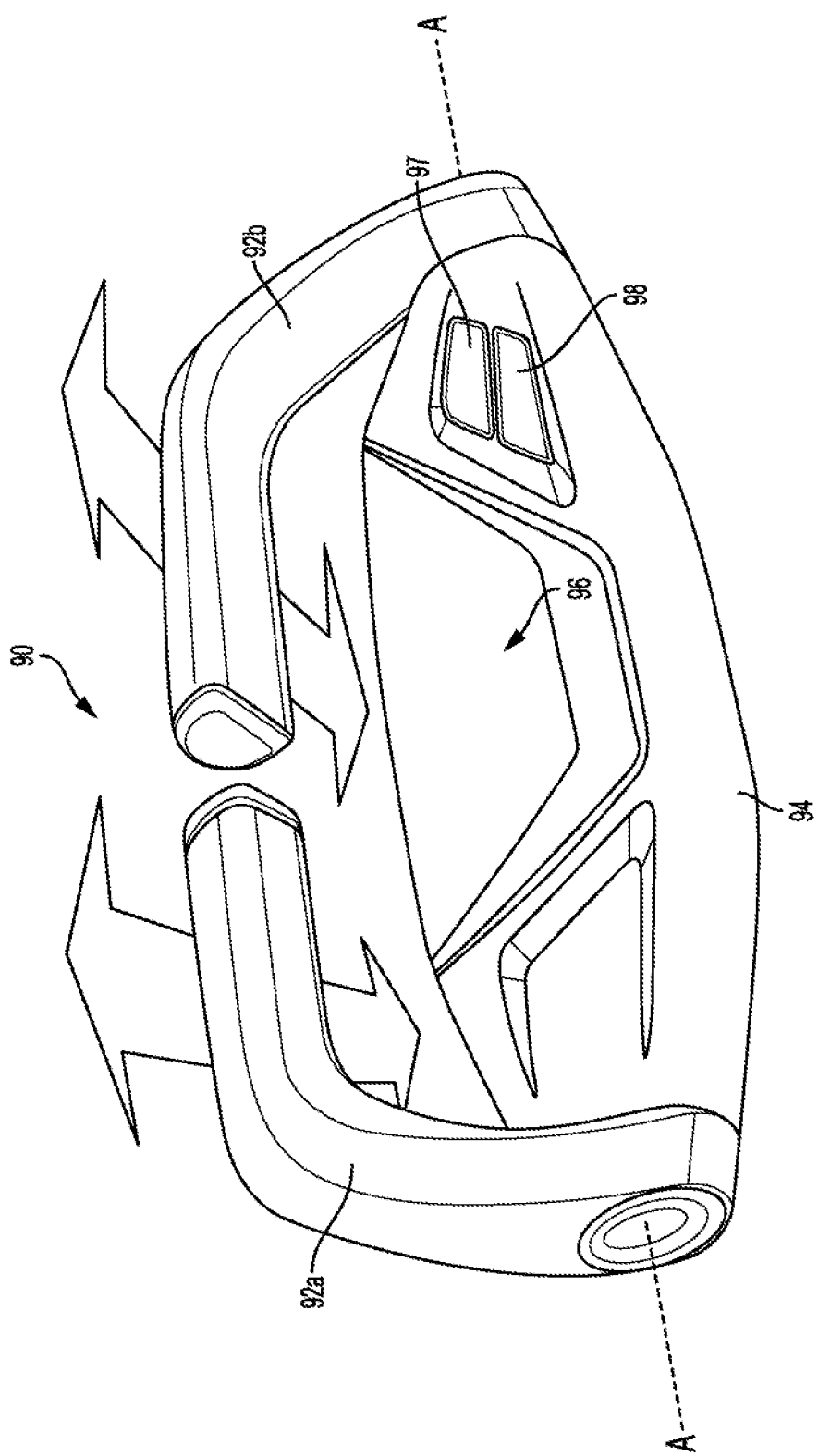
FIG. 10 is a perspective view of a steering and drive control configuration for a zero turn radius lawnmower in accordance with another aspect of the disclosure.

Referring to FIG. 10, a control assembly 90 in accordance with another aspect of the disclosure is illustrated. Control assembly 90 includes a pair of opposing control levers 92a, 92b which, when at least partially rotated about an axis A, provide for forward speed and direction control, reverse speed and direction control, and turning control of a zero turn radius lawnmower. A central console 94 extends between control levers 92a, 92b, and includes a palm rest portion 96 upon which operators may rest their palms during manipulation of control levers 92a, 92b with their fingers. Forward motion and speed of the zero turn radius lawnmower may be controlled by pressing control levers 92a, 92b in a forward direction, away from the operator, reverse motion and speed may be controlled by pulling control levers 92a, 92b toward the operator, and turning may controlled by manipulating one of control levers 92a, 92b in partial or full opposition to the other of control levers 92a, 92b. Additionally and/or alternatively, control assembly 90 may incorporate a cruise control button 97, which enables the operator to set a preferred speed of operation without the need to maintain a constant force on control levers 92a, 92b. The cruise control operation may then be cancelled by activation of cancel button 98, at which time operator control of the zero turn lawnmower's speed must be dictated through manipulation of control levers 92a, 92b.

While control assembly 90 utilizes control paddles 92a, 92b which are rotatable fore-and-aft in a similar manner as conventional control levers used on many zero turn radius lawnmowers, the operator may still utilize control assembly 90 to at least partially support their weight during operation of the zero turn radius lawnmower, as the palm rest portion provides for a fixed support upon which the operator may lean or hold. Accordingly, the operator's weight may be supported by foot platforms, a seat, and/or control assembly 90, as opposed to only a seat.

Referring once again to FIG. 11A, mower deck assembly 100, which includes a plurality of mower deck modules 30, 31, is configured to be suspended from each respective rocker arm 22a, 22b, as described above with respect to FIGS. 1-5A. In addition to at least some of mower deck modules 30, 31 being selectively attachable and detachable from the mower deck assembly 100, and in addition to each mower deck module 30, 31 having a dedicated blade motor 32, one or more of the mower deck modules 30, 31 may further include one or more movable discharge chutes 106.

Discharge chutes 106 may be configured to selectively oscillate along at least a portion of the periphery of mower deck modules 30, 31 in order to direct grass clippings to different areas as the zero turn lawnmower travels along a certain path. In one embodiment, the operator may select the location of each discharge chute 106 relative to the mower deck module 30, 31, and the discharge chutes 106 may remain stationary during the operation based on this operator selection. However, in another embodiment, one or more of discharge chutes 106 may actively oscillate during a mowing operation, thereby more evenly spreading grass clippings to various locations in the path of the zero turn lawnmower. While not shown in FIG. 11A, each discharge chute 106 may be movable by a dedicated electric motor or, alternatively, blade motors 32 may be configured to also impart motion on discharge chutes 106.

Figure 12:
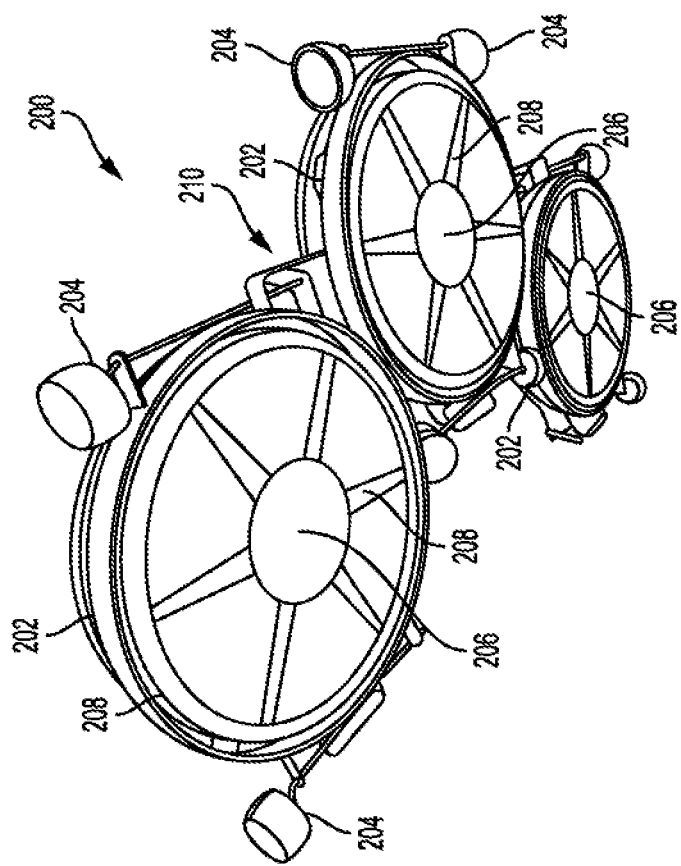
FIG. 12 is a bottom perspective view of a mower deck configuration for a zero turn radius lawnmower in accordance with another aspect of the disclosure.

Referring to FIGS. 12-14B, a mower deck assembly 200 in accordance with another aspect of the disclosure is illustrated. Similar to mower deck assembly 100 described above, mower deck assembly 200 includes a plurality of coupled mower deck modules 202. Each mower deck module 202 includes at least one roller 204, which allows mower deck modules 202 to follow the contours of the ground when mower deck assembly 200 is lowered into a mowing position. As shown in FIG. 12, each of mower deck modules 202 also includes a blade assembly 206 having a plurality of mower blades 208 provided for rotational cutting within mower deck modules 202. For example, each blade assembly 206 may include six mower blades 208, which each mower blade having cutting surfaces optimized to provide an even cutting surface, reduced blade noise, etc. However, blade assemblies 206 may be configured to have more or fewer than six mower blades 208, and each blade 208 may be configured in any appropriate manner.

Figure 13:
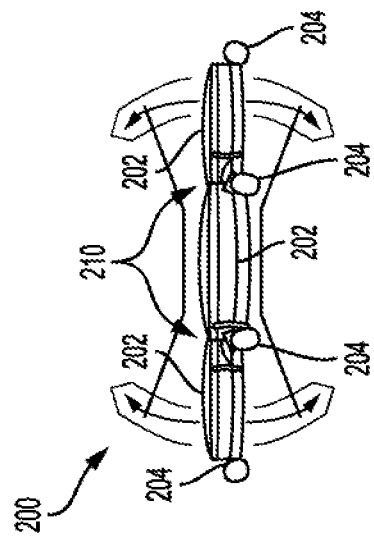
FIG. 13 is a front view of the mower deck configuration illustrated in FIG. 12.

Joining neighboring mower deck modules 202 is a hinged joint 210. As illustrated in FIG. 13, hinged joint 210 enables mower deck modules 202 to pivot independently in a vertical direction relative to the ground surface. Thus, as the mower deck assembly 200 traverses the terrain below a zero turn radius lawnmower, each mower deck module 202 is capable of pivoting about its hinged joint 210 to follow the contours of the ground surface. Alternatively, joint 210 may also be a vertically sliding joint (as opposed to only a hinged joint), thereby allowing each entire mower deck module 202 to move vertically with changes in terrain. As each mower deck module 202 includes a dedicated blade motor (such as blade motor 32 described above with respect to FIG. 11A), the rotational axis of each blade assembly 206 may be different during operation of the zero turn radius lawnmower, as drive pulley and belt angle considerations common with conventional mower deck assemblies are no longer a concern. The hinged joint 210 may also be configured to allow for mower deck modules 202 to be selectively attached and detached from the overall mower deck assembly 200, thereby enabling the operator to customize the size and/or configuration of mower deck assembly 200.

Figure 14A:
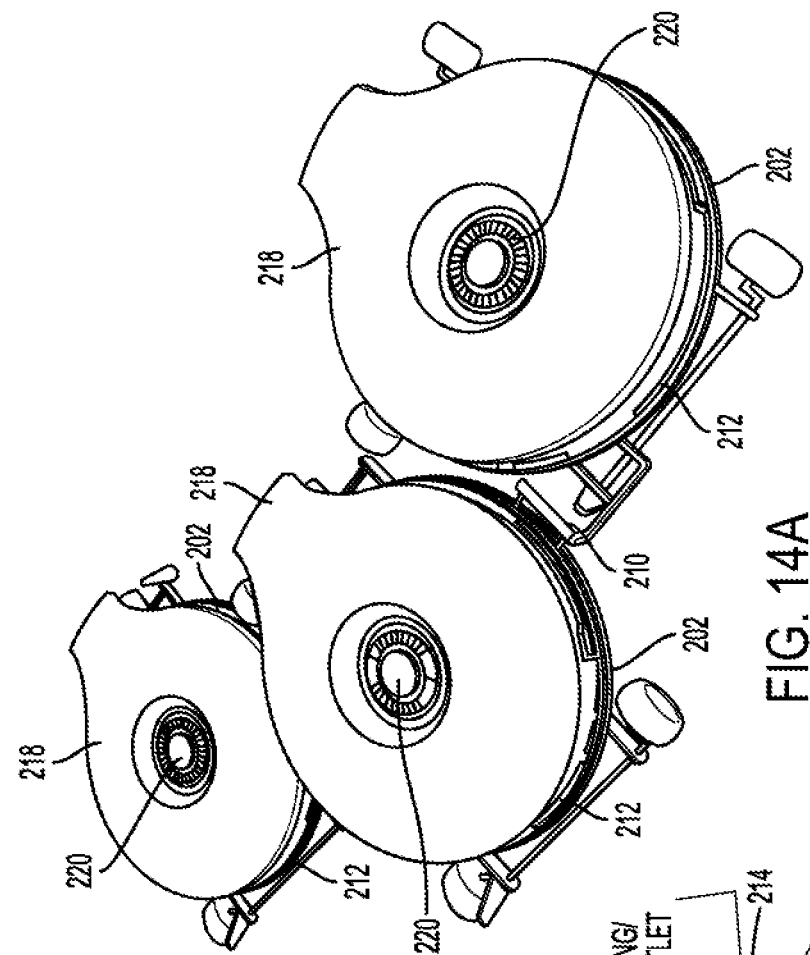
FIG. 14A is a perspective view of the mower deck configuration illustrated in FIG. 12.
Figure 14B:
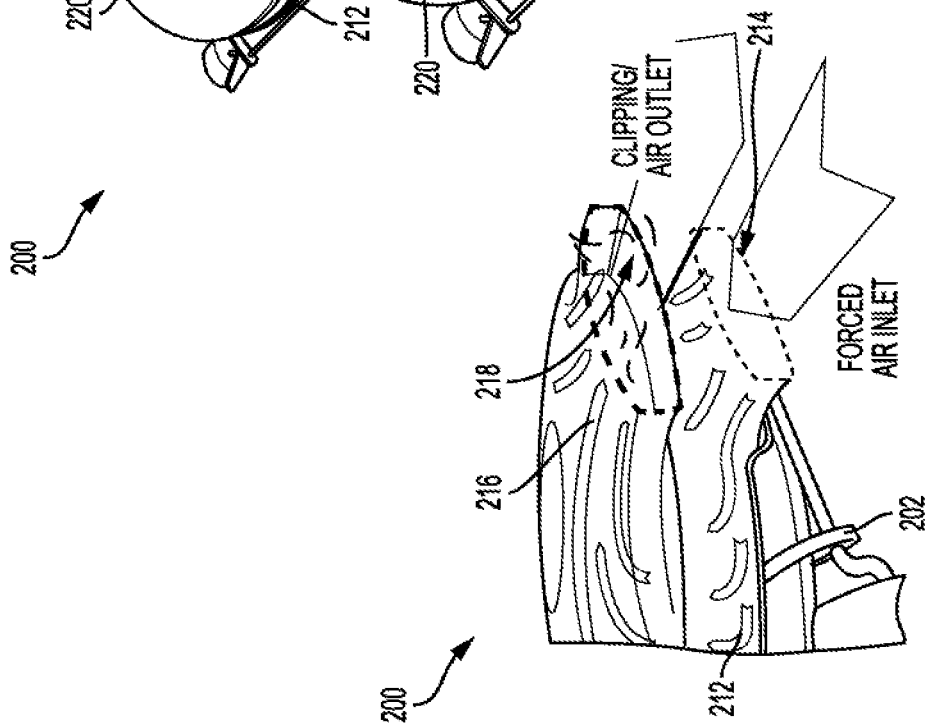
FIG. 14B is a perspective view of an air inlet/outlet configuration for the mower deck configuration illustrated in FIG. 12.

In accordance with another aspect, as shown in FIGS. 14A-14B, mower deck assembly 200 may further include a means of providing both a forced air inlet and air outlet for each mower deck module 202. Specifically, each mower deck module 202 may include a forced air inlet device 212, which is powered so as to force air through a forced air inlet opening 214 and into the area below mower deck module 202 occupied by blade assemblies 206. The forced air causes the grass or other vegetation to lift upward in the direction of blade assemblies 206, thereby providing for a more even cut. Additionally, the forced air inlet devices 212 allow for the mower blades 208 to be optimized for cutting, as opposed to mower blades 208 being sized and shaped to also account for providing lifting air flow within the mower deck modules 202.

The cut grass or other vegetation may then be delivered to a clipping/air outlet device 216, which is powered to forcibly blow air and clippings out of mower deck module 202 through clipping/air outlet opening 218 in order to disperse the clippings and avoid the blade assemblies 206 from becoming clogged with cut clippings. The forced air inlet device 212 and the clipping/air outlet device 216 may share an electric drive motor 220 or, alternatively, each of forced air inlet device 212 and the clipping/air outlet device 216 may include a dedicated electric drive motor. Electric drive motors 220, like blade motors 32, may be powered by a centralized power source (e.g., a central lithium ion battery) located on board the zero turn radius lawnmower, or may be powered by one or more dedicated power sources. Dedicated electric drive motors may also allow for forced air inlet devices 212 and/or clipping/air outlet devices 216 to be independently controllable. Alternatively, a centralized vacuum device may be located onboard the zero turn radius lawnmower (e.g., in a space within main chassis 26), and air ducts may be run to each mower deck module to provide for a forced air inlet/outlet. Furthermore, as opposed to each mower deck module 202 having a forced air inlet opening 214 and a clipping/air outlet opening 218, a manifold may connect all mower deck modules 202 such that only a single forced air inlet opening and/or clipping/air outlet opening is needed.

While not shown in FIGS. 14A-14B, clipping/air outlet device 216 may be configured to at least partially oscillate so as to disperse grass clippings during operation of the zero turn radius lawnmower, similar to the oscillation of discharge chutes 106 as described above with respect to FIG. 11A. Additionally, each clipping/air outlet device 216 may include a supplemental cutting device (or devices) at or near clipping/air outlet opening 218 so as to further shred and/or grind the clippings prior to their dispersal across the ground surface. In this way, the grass clippings or other vegetation clippings are more finely cut to allow for better dispersion and decomposition within the mowed lawn.

Referring once again to FIG. 3 and FIGS. 5A-5B, zero turn radius lawnmower 10 may include a digital display 48 at or near control console 12, forward of the operator's seat 16 and accessible to the operator when the operator is seated or standing on zero turn radius lawnmower 10. Digital display 48 may be configured to show various types of information, such as speed, remaining battery life, mower deck settings, distance/time information, etc. Additionally and/or alternatively, digital display 48 may be configured as a touchscreen display, thereby allowing the operator to select information from a menu screen, change various operational settings (e.g., mower deck height, maximum speed, etc.). Example touch screen types may include resistive touch screens, surface capacitive touch screen, projective capacitive touch screens, surface acoustic wave (SAW) touch screens, Infrared (IR) touch screens, and/or a combination thereof. Further, the digital display may utilize liquid crystal display (LCD), light emitting diode (LED), organic light emitting diode (OLED), or other similar display technology to provide information to the operator.

Figure 15B:
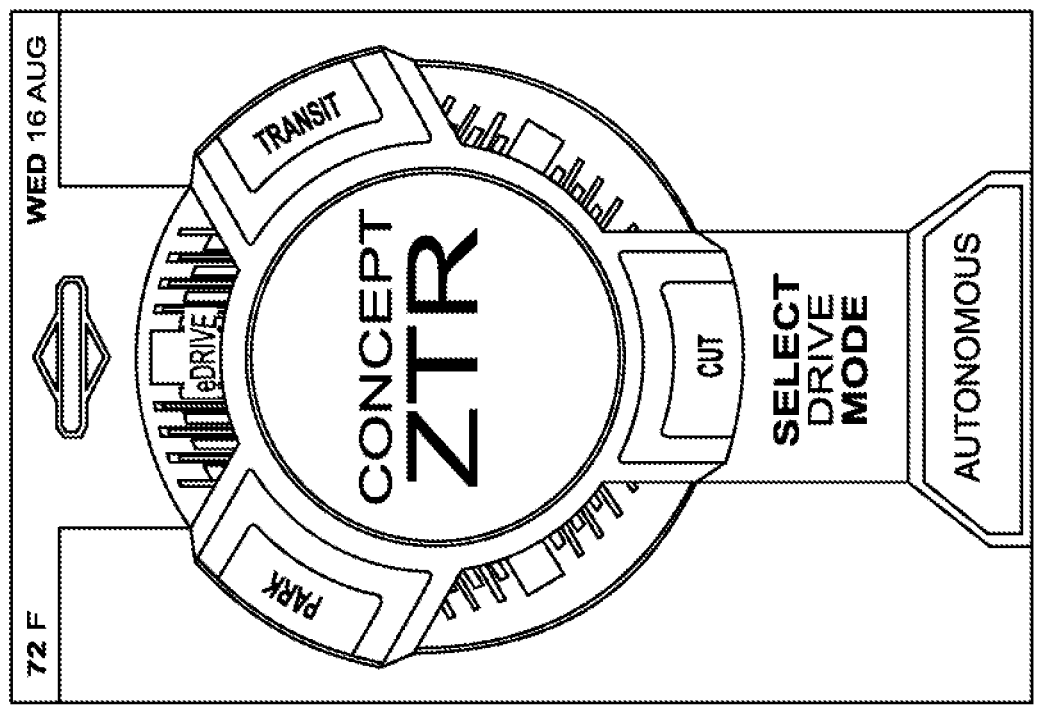
FIG. 15B is another display screen view on a touchscreen of a zero turn radius lawnmower in accordance with an aspect of the disclosure.
Figure 15A:
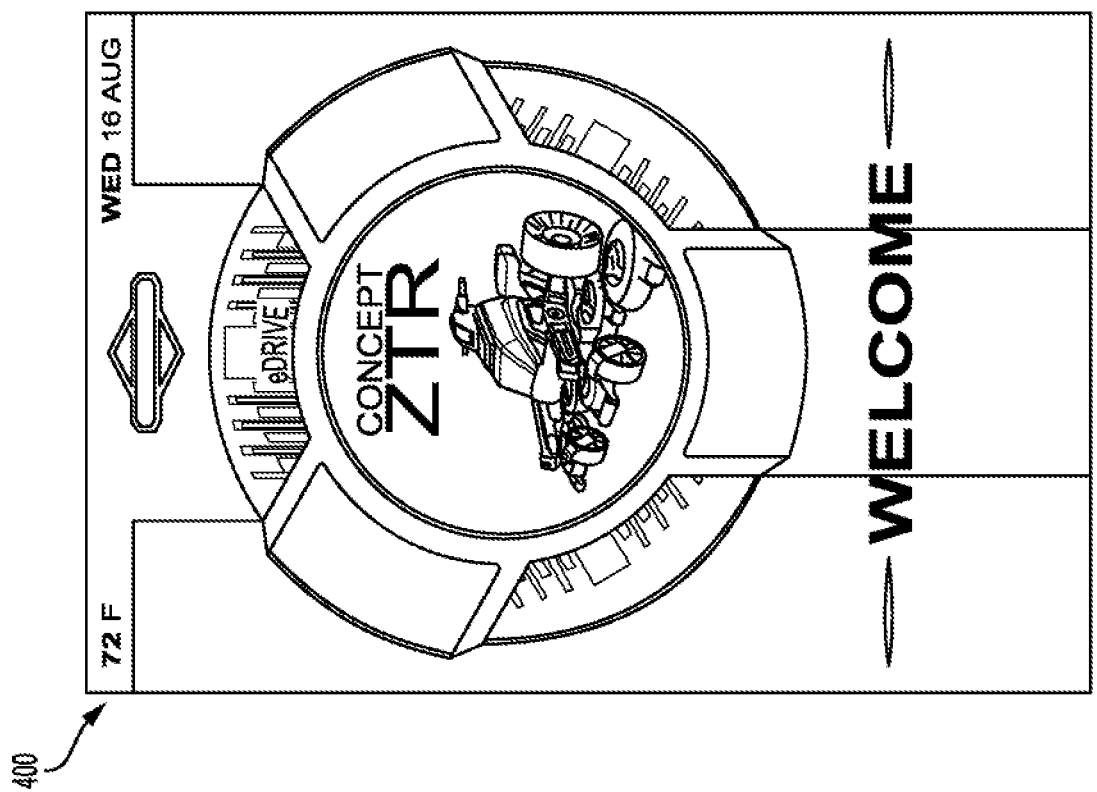
FIG. 15A is a display screen view on a touchscreen of a zero turn radius lawnmower in accordance with an aspect of the disclosure.

For example, referring to FIGS. 15A-15F, various display configurations for digital display 48 are illustrated. FIG. 15A shows an initial "welcome" screen 400, which may be presented to the operator on digital display 48 at the time of start-up of the zero turn radius lawnmower 10. Screen 400 may provide the operator with a variety of information, such as temperature, time, date, etc. FIG. 15B illustrates a secondary screen 402, which may provide the operator with various drive mode settings, such as, e.g., "Park", "Transit", and "Cut". As noted above, digital display 48 may be configured as a touchscreen, thereby allowing the operator to select a drive mode shown on secondary screen 402 directly via digital display 48. Alternatively, control console 12 may include one or more soft keys, joysticks, etc. located near digital display 48 to allow the operator to select various settings provided on secondary screen 402.

Referring still to FIG. 15B, secondary screen 402 may further provide a drive mode selection for "autonomous" control of the zero turn radius lawnmower 10. As both the drive wheels and mower blades of zero turn radius lawnmower 10 may be electrically driven via dedicated motors, zero turn radius lawnmower 10 may include one or more controllers (not shown) for controlling the operation of some or all of the electronic components of the system. The one or more controllers and related componentry may be housed within a protected location of main chassis 26. While the controller(s) may be configured to control the movements and operation of zero turn radius lawnmower 10 based on direct operator inputs, in accordance with another aspect of the disclosure, the controller(s) may be configured to allow for autonomous control of zero turn radius lawnmower 10. That is, based on a programmed path, programmed settings, a learned path, learned settings, sensed global position, and/or other factors, the controller(s) may autonomously control the path and mowing settings of zero turn radius lawnmower 10. Thus, zero turn radius lawnmower 10 may be controlled through direct operator input, through a combination of direct operator input and autonomous control, or through autonomous control only. As will be described further below, the operator may select the settings and/or path of the autonomous control via the digital display 48.

Figures 15C, 15D:
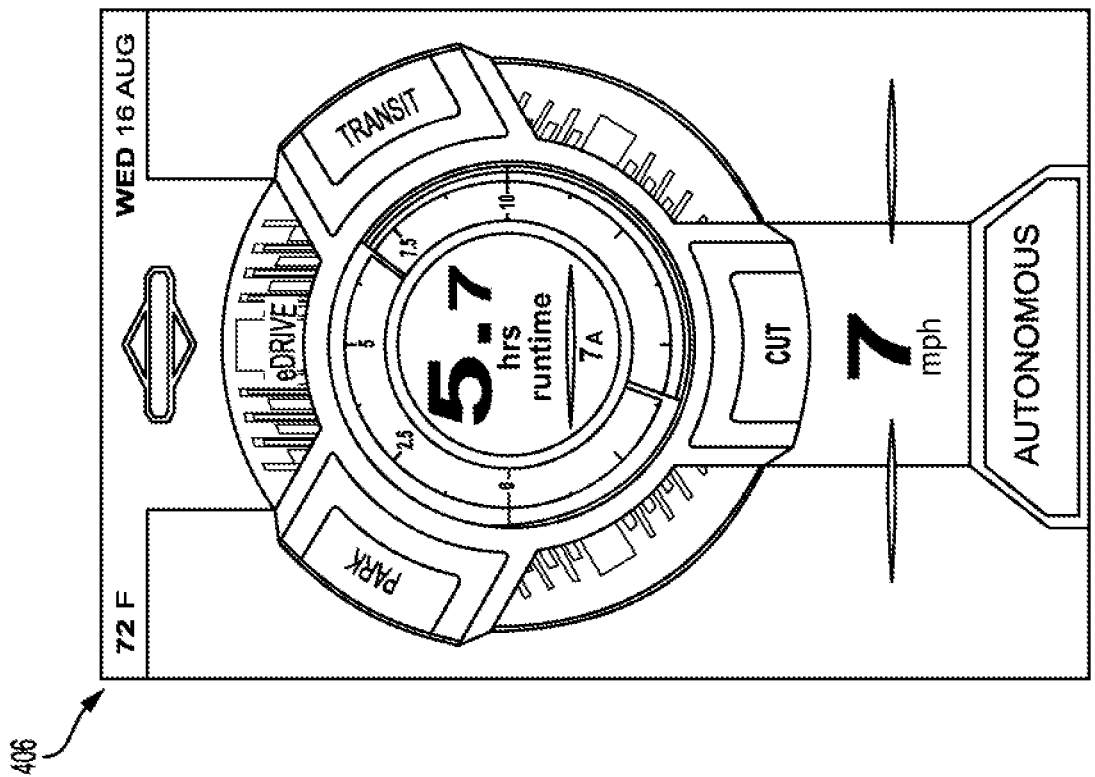
FIG. 15C is another display screen view on a touchscreen of a zero turn radius lawnmower in accordance with an aspect of the disclosure.
FIG. 15D is another display screen view on a touchscreen of a zero turn radius lawnmower in accordance with an aspect of the disclosure.

Referring now to FIGS. 15C-15D, respective display screens 404, 406 providing various forms of operational information to the operator are shown. Display screen 404, for example, displays operational information related to a "Transit" mode. Such information may be the top speed of the zero turn radius lawnmower 10 when in the "Transit" mode, the amount of runtime remaining if operated in such a mode, etc. Similarly, display screen 406 shown in FIG. 15D provides operational information related to a "Cut" mode. It is to be noted that the operational information shown in FIGS. 15C-15D is not limiting, and more or fewer forms of information and/or settings may be displayed to the user. Furthermore, display screens 404 and 406 may provide the operator with an indication of the amount of energy consumption at any given time. As shown in the display screens 404, 406, the operator is using seven amps (A), which is displayed in both a usage gauge, shown as a ring around the center information display of the display screens 404, 406, and as a digital readout within the center information display. In some embodiments, the operator may be able to configure the display screens 404, 406 (or other display screens) to display other information based on a desire of the operator. Example information may include runtime, energy usage, current mode, estimated remaining distance, current speed, deck height, blade speed, location, estimated time to recharge, average energy consumption, battery charge levels, etc. Some of the above listed other information is described in more detail below.

As noted above with respect to FIG. 15B, the digital display 48 may provide the operator with an option for autonomous control of the zero turn radius lawnmower 10.

Figure 15E:
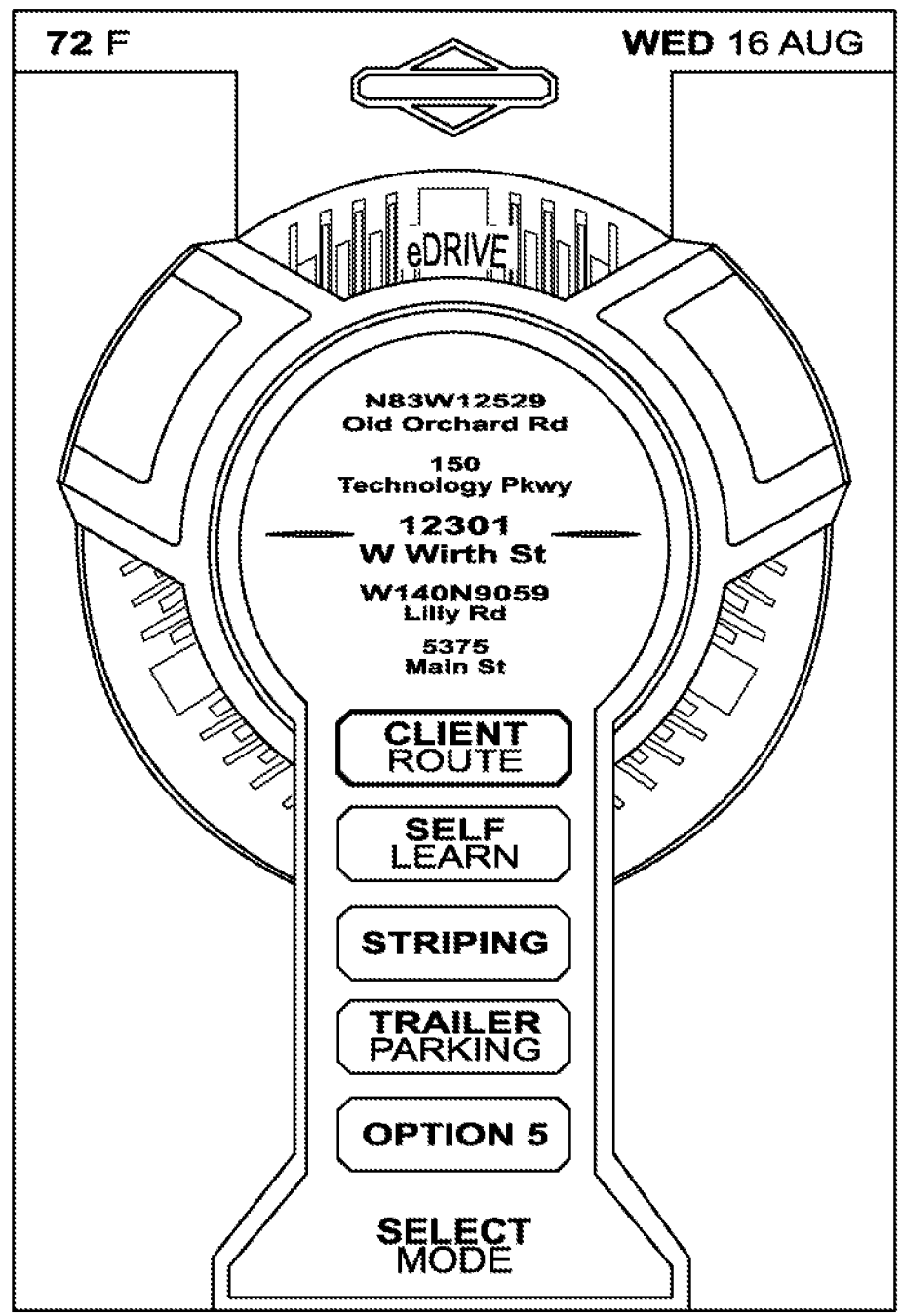
FIG. 15E is another display screen view on a touchscreen of a zero turn radius lawnmower in accordance with an aspect of the disclosure.

Turning to FIG. 15E, a display screen 408 illustrating various user-selectable options under the autonomous control setting is shown. In the "Autonomous" mode, the operator may utilize the digital display 48 to select from a variety of control settings, such as, for example, "Client Route", "Self Learn", "Striping", "Trailer Parking", etc. In one aspect, if "Client Route" is selected, a plurality of pre-programmed mowing routes may be displayed to the operator for selection. The pre-programmed routes may be installed into a memory of the controller(s) through any appropriate means, such as, for example, a learned route, a drawn route, etc. In one embodiment, the operator may add new "Client Routes" by selecting "Self Learn" when mowing at a new location or mowing a different path at an existing client location. In other embodiments, the operator may be able to add a new "Client Route" using other techniques, such as downloading a pre-defined route onto the digital display 48, outlining the route in the digital display, or through other similar techniques. In one example, the digital display 48 may be configured to interface with a global positioning system (GPS) to allow the operator to set exact coordinates associated with the client route. In other examples, the digital display 48 may be configured to interface with a mobile device (e.g. a smartphone) of the operator. The operator may be able to use their mobile device, via an application associated with the zero turn radius lawnmower 10, to set up a new client route.

Figure 15F:
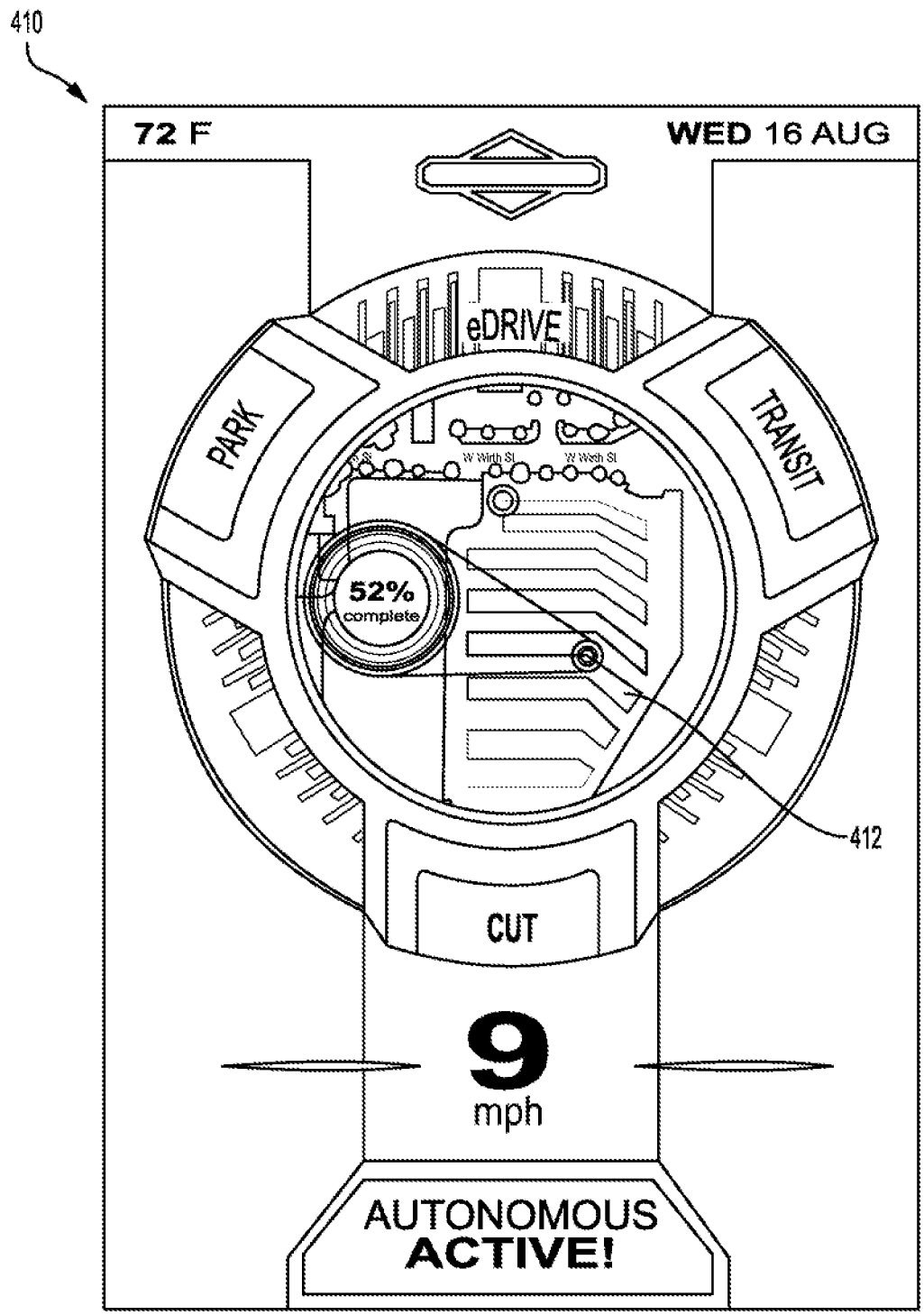
FIG. 15F is another display screen view on a touchscreen of a zero turn radius lawnmower in accordance with an aspect of the disclosure.

Referring to FIG. 15F, another display screen 410 under the "Autonomous" mode is shown. Display screen 410 may provide, for example, a satellite image of a select land parcel to be mowed. In one embodiment, the display screen 410 may access satellite imagery via a connection to a cloud based service. For example, the display screen 410, via a communication module (not shown) may communicate with a cloud based service directly via a Wi-Fi or cellular connection (e.g. 3G, 4G, LTE, CDMA, etc.). In other examples, the display screen 410, via the communication module, may communicate wirelessly (e.g. Bluetooth, NFC, Wi-Fi, Zigbee, or the like, or via a wired connection, to a user device (e.g. smartphone) of the operator, which can provide the necessary information (such as satellite imagery, GPS coordinates, etc.) to the display screen 410. While a satellite image is shown in FIG. 15F, it is to be understood that other illustrations, such as line drawings of the parcel, may be utilized instead. Display screen 410 may further show a superimposed mowing route 412 over the select land parcel, with the mowing route having been selected from the plurality of pre-programmed routes, as described above. Alternatively and/or additionally, the mowing route 412 may be drawn directly on display screen 410 by the operator, the operator's supervisor, etc., prior to the mowing operation. In the "Autonomous" mode, the zero turn radius lawnmower 10 may then follow the selected mowing route 412, and display screen 410 may show additional information, such as the completion percentage of a selected route, the speed of the mower, etc. Again, it is to be noted that the operational and other information shown in FIGS. 15E-15F is not limiting, and more or fewer forms of information and/or settings may be displayed to the user.

While not shown in FIGS. 15A-15F, the digital display 48 may also provide work instructions to the operator, even when not operated in an "Autonomous" mode. For example, digital display 48 may provide client preferences or requirements for a particular parcel, a list of that day's work sites and/or scheduling information, etc.

The control console 12 may also include a storage compartment (not shown) in the vicinity of the steering controls and/or digital display, wherein the storage compartment may be configured to provide a convenient and secure location for the operator's belongings, such as keys, mobile devices, identification, etc.

While FIGS. 1-5B illustrate ride-on zero turn radius lawnmower, it is to be understood that the features described herein may also be applicable to other types of outdoor power equipment, such as stand-on lawnmowers, walk-behind lawnmowers, aerators, brushcutters, etc. Furthermore, in addition to (or in lieu of) a mower deck assembly, other attachments such as a snowblower, plow, cart, etc. may be couplable to the zero turn radius lawnmower shown and described with respect to FIGS. 1-5B.

Figure 16:
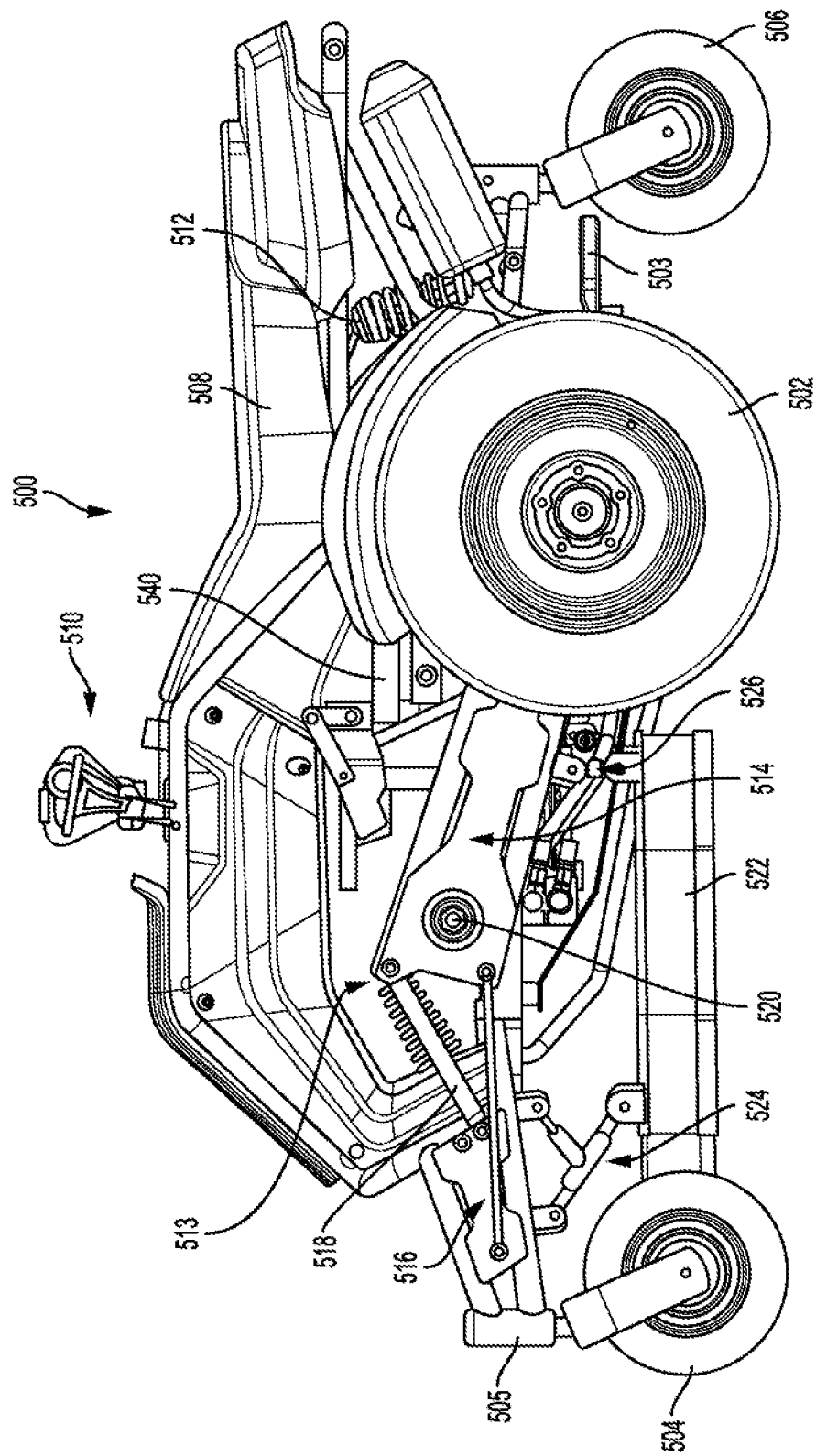
FIG. 16 is a side view of a zero turn radius lawnmower in accordance with another aspect of the disclosure.
Figure 17:
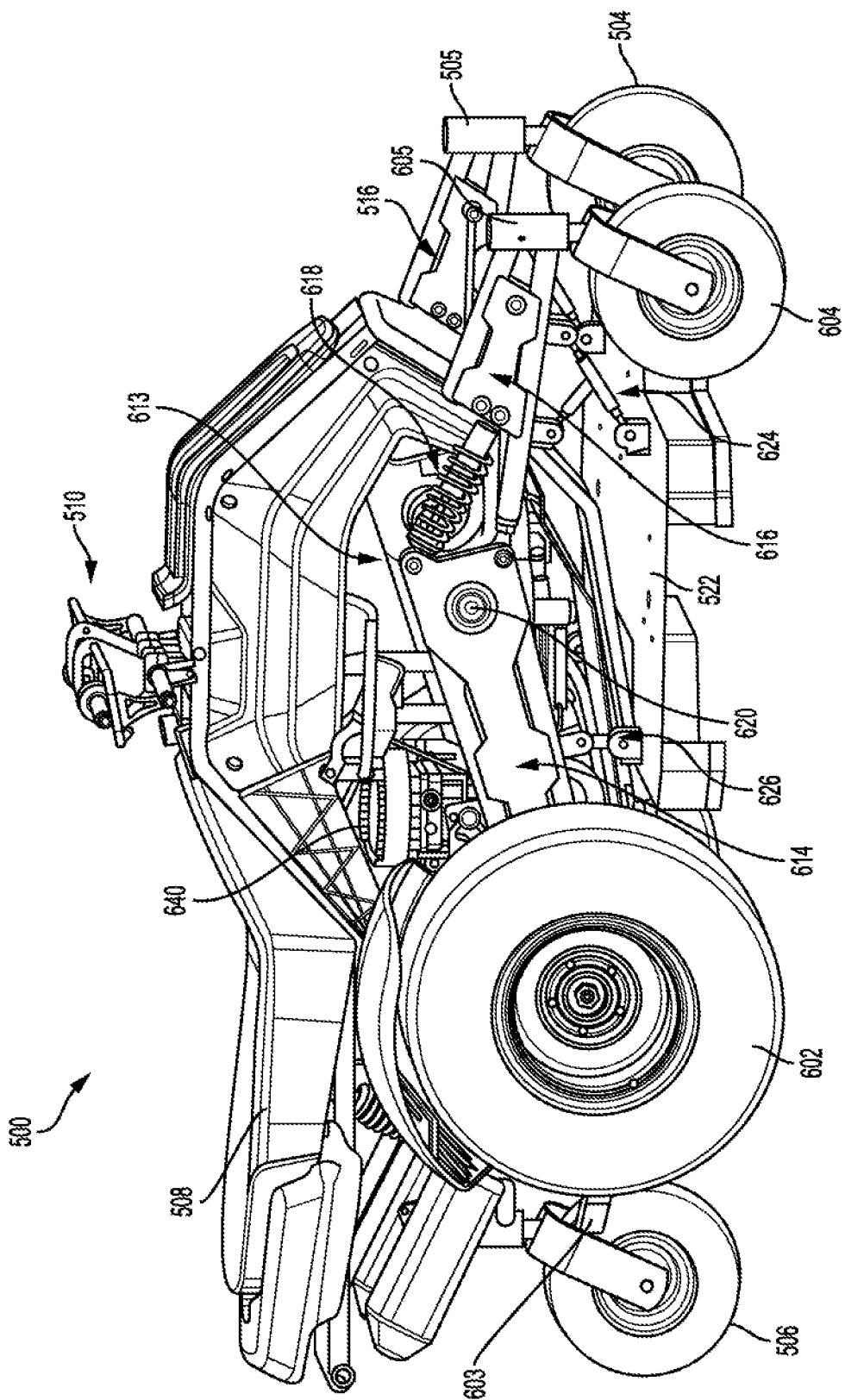
FIG. 17 is a side perspective view of the zero turn radius lawnmower of FIG. 16.
Figure 18:
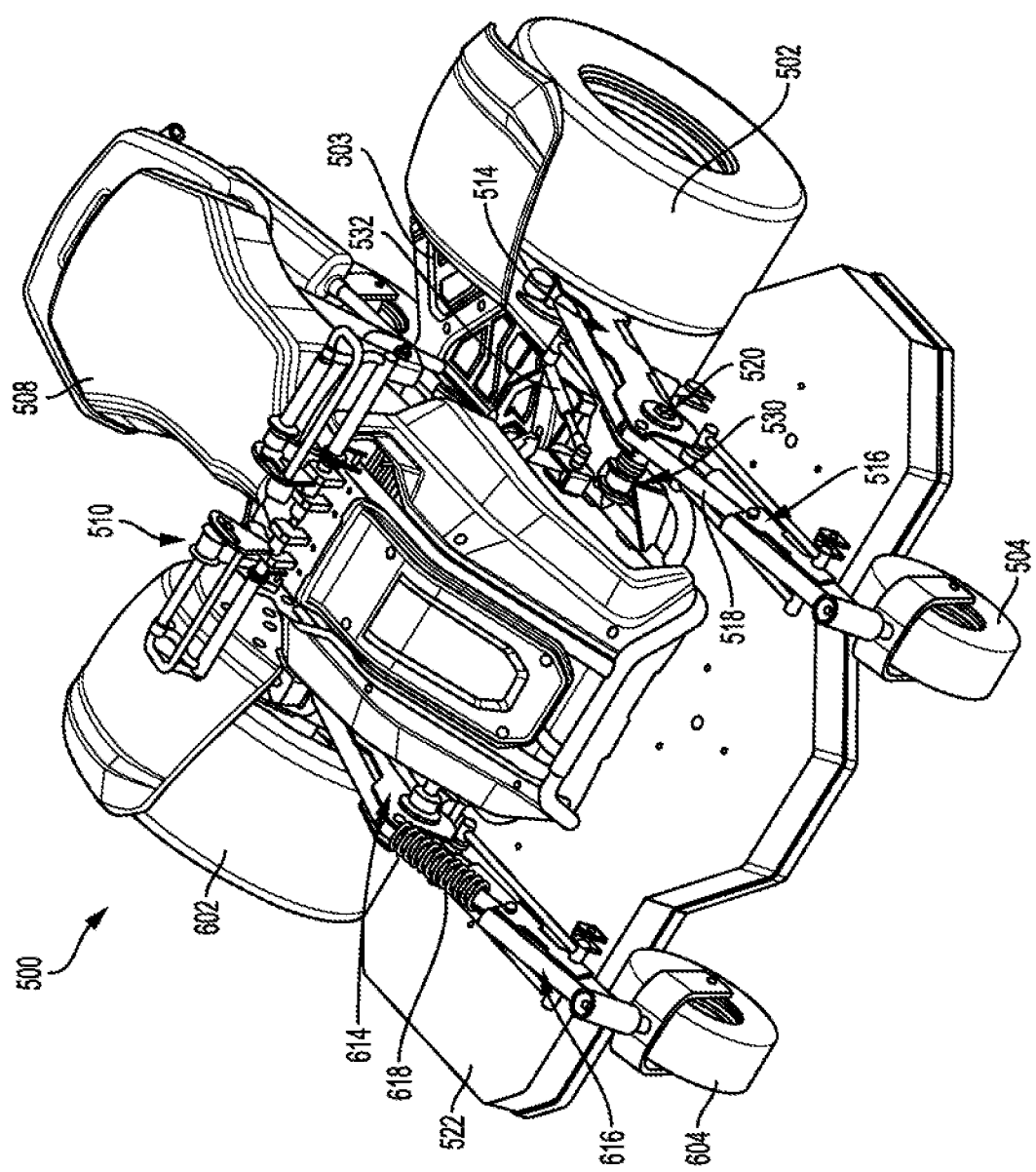
FIG. 18 is a top perspective view of the zero turn radius lawnmower of FIG. 16.

Next, referring to FIGS. 16-18, a ride-on vehicle in the form of a zero turn radius lawnmower 500 in accordance with another aspect of the disclosure is shown. Similar to zero turn radius lawnmower 10 described above with respect to FIGS. 1-5B, zero turn radius lawnmower 500 includes an operator seat 508 configured as a saddle-type base over which the operator's legs may straddle during operation of the zero turn radius lawnmower 500. A pair of foot platforms 503, 603 located on opposite sides of seat 508 provide a stable location for the operator's feet as they straddle seat 508, allowing the operator to be positioned in a manner similar to that of a motorcycle, snowmobile, personal watercraft, etc. With this positioning, the operator's body weight is not solely supported by seat 508, but may also be at least partially supported by foot platforms 503, 603 and/or drive controls 510, with drive controls 510 being described in further detail below with respect to FIG. 20.

Zero turn radius lawnmower 500 also includes a pair of rear drive wheels 502, 602. Unlike zero turn radius lawnmower 10 described above, which includes drive wheels driven by respective electric wheel motors, each of rear drive wheels 502, 602 is configured to be independently driven by a respective hydraulic wheel motor (not shown) in both forward and reverse directions, with the hydraulic wheel motors being coupled to a respective hydraulic pump 540, 640 via, e.g., hydraulic hoses (not shown). In turn, pumps 540, 640 are driven by a powerhead such as, e.g., an internal combustion engine (not shown). Thus, unlike electrically-driven zero turn lawnmower 10 described above with respect to FIGS. 1-5B, zero turn lawnmower 500 is shown as being powered by an internal combustion engine. However, it is to be understood that other drive configurations, such as, e.g., a hybrid gas/electric drive configuration, a full electric drive configuration, etc., are also possible and are within the scope of this disclosure.

Unlike rocker arms 22a, 22b shown and described above with respect to FIGS. 1-5B, zero turn radius lawnmower 500 employs a pair of sectioned rocker arm assemblies 513, 613. That is, each of rear drive wheels 502, 602 is rotatably coupled to a respective rear end portion 514, 614 of a respective sectioned rocker arm assembly 513, 613, with each rear end portion 514, 614 configured to independently pivot relative to a main chassis of zero turn radius lawnmower 500 along a respective pivot joint 520, 620. Pivotally coupled to the rear end portions 514, 614 of the respective sectioned rocker arm assemblies 513, 613 are respective front end portions 516, 616, thereby providing a complete rocker arm assembly having separate front and rear end portions which may pivot in a scissor-type motion relative to one another, even as the entire rocker arm assemblies pivot about pivot joints 520, 620. A distal end of each respective front end portion 516, 616 is coupled to a respective front caster assembly 505, 605 having front caster wheel 504, 604, which may be configured to freely rotate 360° to allow for zero turn radius maneuvering of zero turn radius lawnmower 500. Thus, the sectioned rocker arm assemblies 513, 613 are each configured as a linkage between respective rear drive wheels 502, 602 and front caster wheels 504, 604, with rear drive wheels 502, 602 and front caster wheels 504, 604 related in partial rotation about a respective pivot joint 520, 620.

Such a configuration may be considered a modified "rocker bogie" suspension arrangement, which utilizes a pair of independently-pivotable rocker arm assemblies on either side of a chassis that allow the chassis to maintain an average pitch angle of both rocker arms as the vehicle travels over varying terrain. With this configuration, any ground input experienced by one of the linked wheels causes a substantially opposite reaction by the other of the linked wheels. In this way, the main chassis (and, thus, the operator aboard seat 508) follows the inputs of both rear drive wheels 502, 602 and front caster wheels 504, 604 to provide for a smooth operating experience, even over rough and/or undulating terrain.

Furthermore, because rocker arm assemblies 513, 613 are each divided into two sections, each portion of the rocker arm may also be coupled to a respective shock absorber (e.g., a coil-over-shock device), thereby providing additional dampening as the zero turn radius lawnmower 500 travels over rough, uneven terrain. For example, referring to FIGS. 17-18, rear end portion 614 of rocker arm assembly 613 is coupled to front end portion 616 by a suspension device 618. Thus, as the zero turn radius lawnmower 500 travels over uneven and/or rough terrain, the suspension device 618 may allow front caster wheel 604 to move vertically with the terrain, thereby absorbing smaller impacts than would be absorbed by the "rocker bogie" arrangement alone, leading to a more comfortable ride for the operator. While suspension device 618 is shown as a coil-over shock device, it is to be understood that any appropriate suspension or dampening device may be utilized. Furthermore, the suspension device(s) may be tunable and/or adjustable to vary the travel, rebound characteristics, etc.

Alternatively, in some configurations, the rear end portion of rocker arm assembly may be coupled to front end portion by a solid linkage, thereby providing a rocker arm assembly having little (if any) pivotal movement between the respective front and rear end portions. For example, referring to FIGS. 16 and 18, as opposed to a suspension device 618, rear end portion 514 of rocker arm assembly 513 is coupled to front end portion 516 by way of a solid linkage 518. Additionally, despite what is shown in FIGS. 16-18, it is to be understood that under normal operating configurations, both rocker arm assemblies 513, 613 would utilize the same type of linkages (e.g., either two solid linkages 518, two suspension devices 618, etc.). In some embodiments, the linkages could be easily swapped, allowing for an operator or maintenance technician to select an optimal rocker arm assembly configuration, dependent upon anticipated terrain, maintenance needs, etc.

By utilizing rocker arm assemblies 513, 613 having separate, couplable front end portions and rear end portions, the rocker arm assemblies 513, 613 may be customized dependent upon user preferences, particular applications, particular attachments, etc. For example, while FIGS. 16-18 show zero turn radius lawnmower 500 configured for use as a lawnmower with a mower deck 522, other attachments and/or configurations are possible, such as, e.g., a snow plow attachment, an alternative mower deck attachment, a snow-thrower attachment, etc. With such alternative configurations, it may be desirable to alter the rocker arm assemblies 513, 613 to better support the attachment(s), distribute weight along the machine, etc. For instance, the respective front end portions 516, 616 may be removed and replaced with shorter or longer front end portions, or front end portions having different supports and/or attachment coupling locations. Alternatively and/or additionally, the rear end portions 514, 614 may be changed dependent upon application.

As shown in FIGS. 16-18, the respective rear end portions 514, 614 and front end portions 516, 616 of rocker arm assemblies 513, 613 are each formed of a plurality of coupled tubular linkages and plates. One or more of the linkages (e.g., linkage 532 shown in FIG. 18) may be utilized as dampening components to help control and/or dampen the movement of rocker arm assemblies 513, 613. Furthermore, in some embodiments, dampening linkages 532 could be replaced with, e.g., sway bars to improve lateral stability of the rocker arm assemblies 513, 613, and may, in some embodiments, be coupled at one end to the chassis or other components of the zero turn radius lawnmower 500. Furthermore, while rocker arm assemblies 513, 613 are shown as being formed by a plurality of tubular linkages and plates, it is to be understood that more or fewer linkages and/or plates may be utilized, and that the shape and material forming the linkages and/or plates may vary.

Referring still to FIGS. 16-18, mower deck 522 is shown suspended from respective rocker arm assemblies 513, 613 between respective drive wheels 502, 602 and front caster wheels 504, 604. Specifically, a pair of front linkages 524, 624 and a pair of rear linkages 526, 626 enable mower deck 522 to move vertically with corresponding movement of each rocker arm assembly 513, 613, thereby preventing lawn scalping or uneven mowing due to vertical movement of caster wheels 504, 604 and/or drive wheels 502, 602. The front linkages 524, 624 and rear linkages 526, 626 may include any number of individual linkage sections, and may be configured and optimized such that the movement of mower deck 522 is limited to any movement of the caster wheels 504, 604 and/or drive wheels 502, 602. Furthermore, while FIGS. 16-18 illustrate mower deck 522 as a substantially continuous, fabricated deck, it is to be understood that mower deck 522 may be configured similarly to mower deck 100 described above with respect to FIGS. 11A-11B, or mower deck 200 described above with respect to FIGS. 12-14B, with individual mower deck modules being attachable, detachable, and/or pivotable relative to other mower deck modules forming the overall mower deck. Additionally, each blade within mower deck 522 may be belt-driven, driven by a dedicated electric motor, or any other appropriate blade-driving means.

As shown in FIGS. 16-19, zero turn radius lawnmower 500 may also include a rear caster wheel 506 located to the rear of respective drive wheels 502, 602. Rear caster wheel 506 may be carried by a suspended linkage coupled to the main chassis by a suspension device 512 (e.g., a coil-over-shock suspension device), allowing the suspended linkage to be vertically pivotable about the main chassis. In this configuration, rear caster wheel 506 acts to support the rear portion of zero turn radius lawnmower 500 without compromising the maneuverability and zero turn radius functionality of the mower. However, while not illustrated, in accordance with another embodiment, rear caster wheel 506 and its associated components may be omitted from zero turn radius lawnmower 500.

Figure 19:
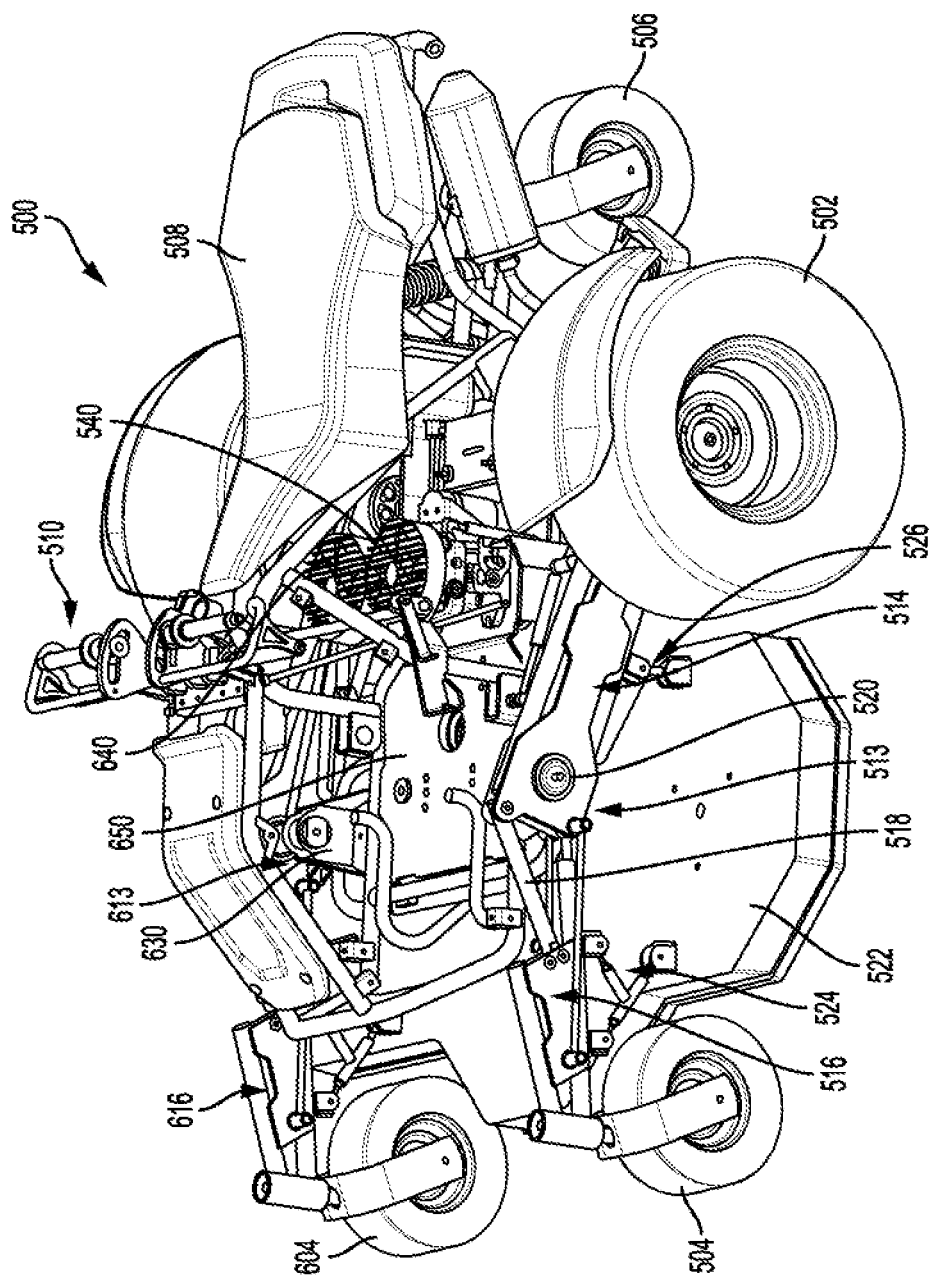
FIG. 19 is another side perspective view of a portion of the zero turn radius lawnmower of FIG. 16.

Next, referring to FIG. 19, another view of zero turn radius lawnmower 500 in accordance with an aspect of the disclosure is shown, with at least one body panel removed to show interior components of the zero turn radius lawnmower 500. As noted above, zero turn radius lawnmower 500 may be powered by any appropriate powerhead, such as, e.g., an internal combustion engine or a battery powered powerhead. The powerhead (not shown) may be mounted to a mounting plate 650, with mounting plate 650 being coupled to a main chassis of the zero turn radius lawnmower 500. Additionally, the mounting plate 650 may be sized to carry other components, such as, e.g., respective hydraulic pumps 540, 640.

As described above, sectioned rocker arm assemblies 513, 613 are each configured to independently pivot relative to a main chassis of zero turn radius lawnmower 500 along a respective pivot joint 520, 620. Specifically, pivot joint 520 is pivotally coupled to a bracket 530 (shown in FIG. 18), while pivot joint 620 is pivotally coupled to a corresponding bracket 630. Each of brackets 530, 630 may be coupled to mounting plate 650. In some embodiments, the coupling may be achieved by permanent or semi-permanent means, such as, e.g., welding. However, in other embodiments, brackets 530, 630 may be configured to be removable and/or adjustable along mounting plate 650 such that the mounting location of brackets 530, 630 may be altered. To enable such adjustability, brackets 530, 630 may be mounted using removable fasteners (e.g., bolts), which may be aligned with various mounting holes (not shown) in mounting plate 650.

By altering the mounting locations of brackets 530, 630, the pivot points of respective rocker arm assemblies 513, 613 are changed, thereby also changing the weight distribution of zero turn radius lawnmower 500. It may be desirable to alter the mounting locations of brackets 530, 630 dependent upon a specific application of the unit. For example, if the unit is utilized as a lawnmower with a under-mounted mower deck, it may be desirable to mount brackets 530, 630 at a first location, but if the unit is used as, e.g., a snowplow, it may be desirable to mount brackets 530, 630 at a second location. Additionally and/or alternatively, the mounting locations of brackets 530, 630 may be altered for other reasons, such as, e.g., different body weights of different operators, comfort preferences, etc.

Figure 20:
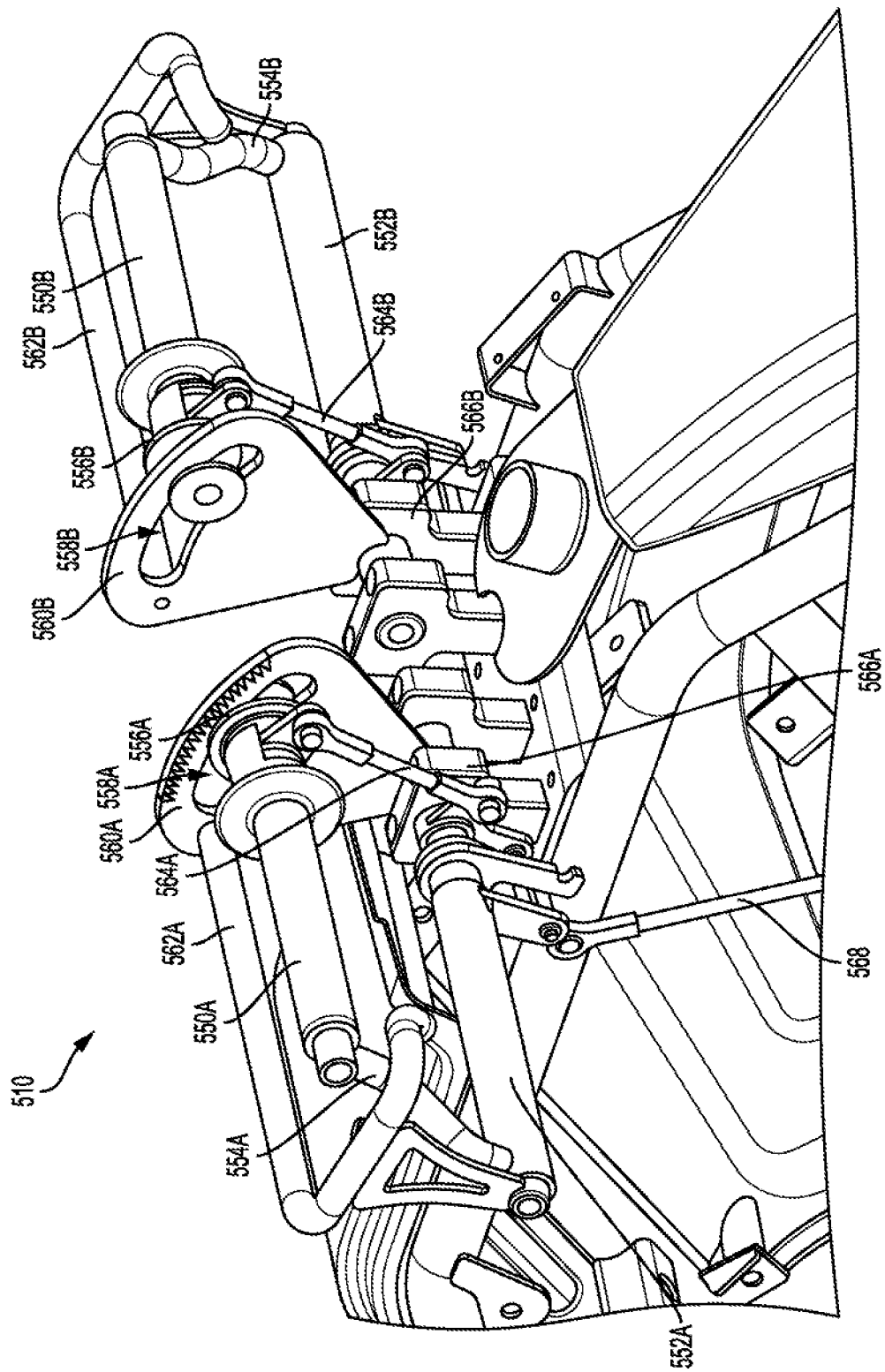
FIG. 20 is a perspective view of the drive controls for the zero turn radius lawnmower of FIG. 16.

Next, referring to FIG. 20, a more detailed view of drive controls 510 is shown. As previously disclosed, the drive wheels of zero turn radius lawnmower 500 may be driven by, e.g., hydraulic wheel motors coupled to respective hydraulic pumps. Drive controls 510 may include respective right and left controls to control movement of corresponding right and left drive wheels. As such, the function of each of the right and left control will be described collectively.

As shown in FIG. 20, a primary control grip 550A, 550B is provided, with primary control grip 550A, 550B configured to be coupled to a connecting arm 554A, 554B, which enables arcuate movement of primary control grip 550A, 550B relative to a pivot sleeve 552A, 552B. Pivot sleeve 552A, 552B is rotatably coupled to a mounting bracket 566A, 566B, which is coupled to the chassis of the zero turn radius lawnmower 500. The primary control grip 550A, 550B includes a sliding interface 556A, 556B, which slides within a slot 558A, 558B of a plate 560A, 560B when primary control grip 550A, 550B is moved fore or aft. The plate 560A, 560B may include indicia or other markings to allow the operator to gauge the direction and/or speed of each drive wheel dependent upon the location of sliding interface 556A, 556B within slot 558A, 558B. A front bar 562A, 562B may be provided, which may enable the operator to better control changes of speed and/or direction of the drive wheels by squeezing the primary control grip 550A, 550B in the direction of front bar 562A, 562B. The front bar 562A, 562B is stationary relative to the pivot sleeve 550A, 550B to provide the operator with more stability and security while operating the zero turn radius lawnmower 500.

During operation, as the operator moves primary control grip 550A, 550B, a linkage 564A, 564B moves correspondingly. This movement of linkage 564A, 564B also leads to movement of respective linkages 568, which are coupled at a distal end to a respective hydraulic pump (not shown). Accordingly, as the operator moves the primary control grip 550A, 550B fore and aft, the linkages 568 alter operation of the hydraulic pumps in order to control the speed and/or direction of the respective drive wheels.

While hydraulic-specific drive controls 510 are illustrated in FIGS. 16-20, it is to be understood that zero turn radius lawnmower 500 may utilize alternative drive control mechanism(s), and that those drive control mechanism(s) may be utilized with hydraulic drive systems, electric drive systems, mechanical drive systems, or any other type of applicable drive system.

Figure 21:
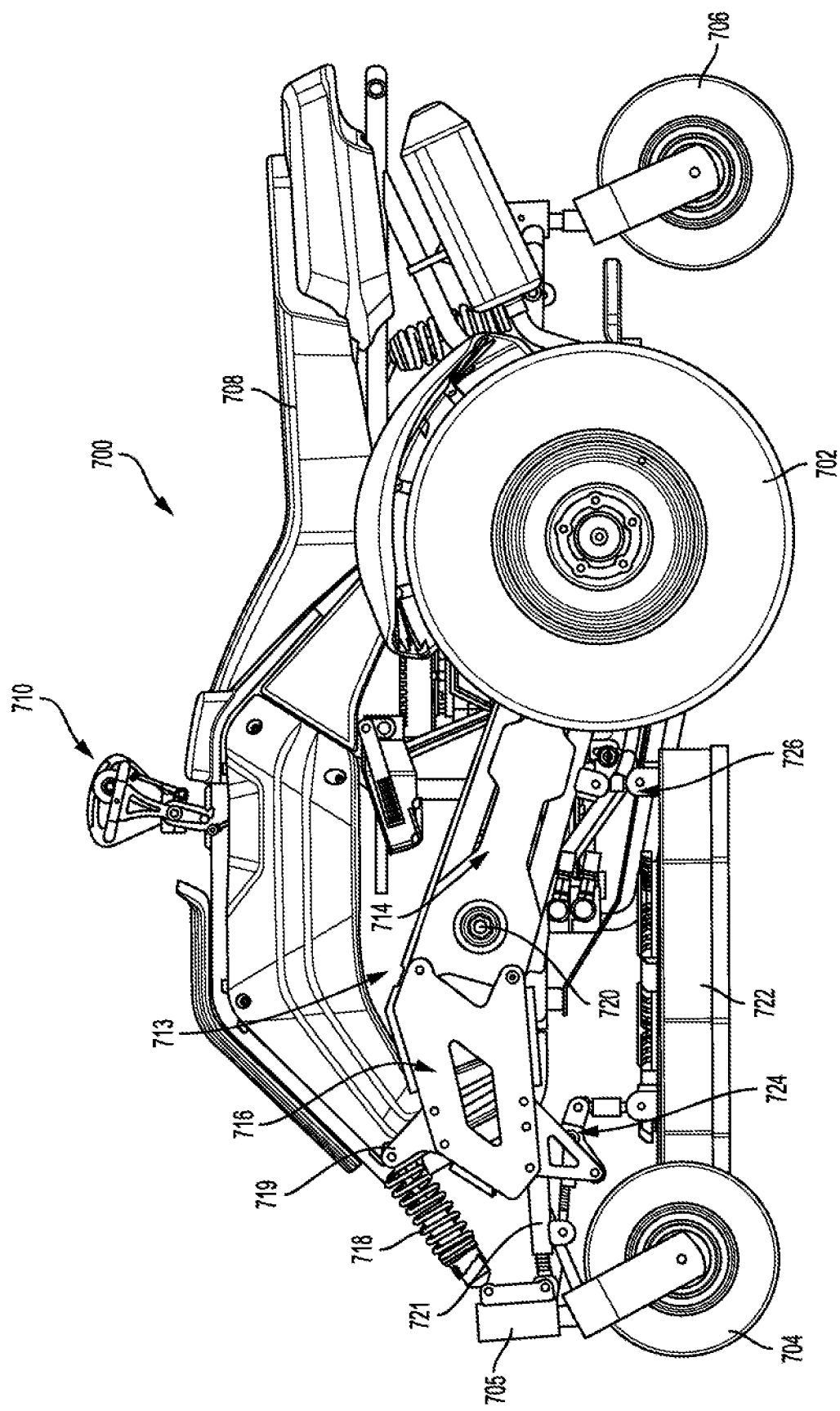
FIG. 21 is a side view of a zero turn radius lawnmower in accordance with another aspect of the disclosure.

Next, referring to FIG. 21, a ride-on vehicle in the form of a zero turn radius lawnmower 700 in accordance with another aspect of the disclosure is shown. Similar to zero turn radius lawnmower 500 described above with respect to FIGS. 16-20, zero turn radius lawnmower 700 includes an operator seat 708 configured as a saddle-type base over which the operator's legs may straddle during operation of the zero turn radius lawnmower 700. A pair of foot platforms (not shown) located on opposite sides of seat 708 provide a stable location for the operator's feet as they straddle seat 708, allowing the operator to be positioned in a manner similar to that of a motorcycle, snowmobile, personal watercraft, etc. With this positioning, the operator's body weight is not solely supported by seat 708, but may also be at least partially supported by the foot platforms and/or drive controls 710.

Zero turn radius lawnmower 700 further includes a pair of rear drive wheels 702. While only one rear drive wheel 702 is shown in FIG. 21, it is to be understood that a substantially similar second rear drive wheel (and other componentry related to the drive system of the lawnmower) is found on the opposite, non-visible side of zero turn radius lawnmower 700. Similar to zero turn radius lawnmower 500 described above, each of rear drive wheels 702 may be configured to be independently driven by a respective hydraulic wheel motor (not shown) in both forward and reverse directions, with the hydraulic wheel motors being coupled to a respective hydraulic pump. However, it is to be understood that other drive configurations, such as, e.g., a hybrid gas/electric drive configuration or full-electric drive configuration, are also possible and are within the scope of this disclosure.

Zero turn radius lawnmower 700 employs a pair of sectioned rocker arm assemblies 713. That is, each of rear drive wheels 702 is rotatably coupled to a respective rear end portion 714 of a respective sectioned rocker arm assembly 713, with each rear end portion 714 configured to independently pivot relative to a main chassis of zero turn radius lawnmower 700 along a respective pivot joint 720. Coupled to the rear end portions 714 of the respective sectioned rocker arm assemblies 713 are respective front end portions 716, thereby providing a complete rocker arm assembly having separate front and rear end portions. A distal end of each respective front end portion 716 is coupled to a respective front caster assembly 705 having front caster wheel 704, which may be configured to freely rotate 360° to allow for zero turn radius maneuvering of zero turn radius lawnmower 700. Thus, the sectioned rocker arm assemblies 713 are each configured as a linkage between respective rear drive wheels 702 and front caster wheels 704, with rear drive wheels 702 and front caster wheels 704 related in partial rotation about a respective pivot joint 720.

Similar to zero turn radius lawnmowers 10 and 500 described above, such a configuration may be considered a modified "rocker bogie" suspension arrangement, which utilizes a pair of independently-pivotable rocker arm assemblies on either side of a chassis that allow the chassis to maintain an average pitch angle of both rocker arms as the vehicle travels over varying terrain. With this configuration, any ground input experienced by one of the linked wheels causes a substantially opposite reaction by the other of the linked wheels. In this way, the main chassis (and, thus, the operator aboard seat 708) follows the inputs of both rear drive wheels 702 and front caster wheels 704 to provide for a smooth operating experience, even over rough and/or undulating terrain.

A mower deck 722 is shown as being suspended from the rocker arm assemblies 713 between respective drive wheels 702 and front caster wheels 704. Specifically, a pair of front linkages 724 and a pair of rear linkages 726 enable mower deck 722 to move vertically with corresponding movement of each rocker arm assemblies 713, thereby preventing lawn scalping or uneven mowing due to vertical movement of caster wheels 704 and/or drive wheels 702. Zero turn radius lawnmower 700 may also include a rear caster wheel 706 located to the rear of respective drive wheels 702. Rear caster wheel 706 may be carried by a suspended linkage (not shown), which is vertically pivotable about a main chassis. In this configuration, rear caster wheel 706 acts to support the rear portion of zero turn radius lawnmower 700 without compromising the maneuverability and zero turn radius functionality of the mower. However, while not illustrated, in accordance with another embodiment, rear caster wheel 706 and its associated components may be omitted from zero turn radius lawnmower 700.

Referring still to FIG. 21, each rocker arm assembly 713 includes a suspension device 718. Suspension device 718 may be, e.g., a coil-over-shock suspension device. However, it is to be understood that suspension device 718 may be any suspension or vibration-damping device. At a first end, each suspension device 718 is coupled directly to front caster assembly 705, while a second, opposite end of each suspension device is coupled to a mounting arm 719 extending from each respective front end portion 716 of the rocker arm assemblies 713. With this configuration, due to the direct coupling of suspension device 718 to front caster assembly 705, a shock leverage ratio is maintained at about a 1:1 ratio. That is, if the front caster wheel 704 is to move 1 inch upward (due to a bump, rock, etc.), the suspension device 718 would compress approximately 1 inch. In this way, the suspension device 718 is capable of reducing vibration during operation of zero turn lawnmower 700, while not providing so much suspension travel as to counteract or override the effectiveness of the modified "rocker bogie" suspension arrangement provided for by the respective rocker arm assemblies 713.

In addition to suspension device 718, each respective front end portion 716 may further include a pivotal linkage 721, which may also be pivotally coupled directly to front caster assembly 705. Additionally, the front linkages 724 coupling mower deck 722 to rocker arm assemblies 713 may be coupled directly to these pivotal linkages 721, thereby allowing the mower deck 722 to move in concert with any movement of front caster wheels 704, even minimal movement that is absorbed by suspension devices 708. Accordingly, the quality of cut may be improved.

Figure 22:
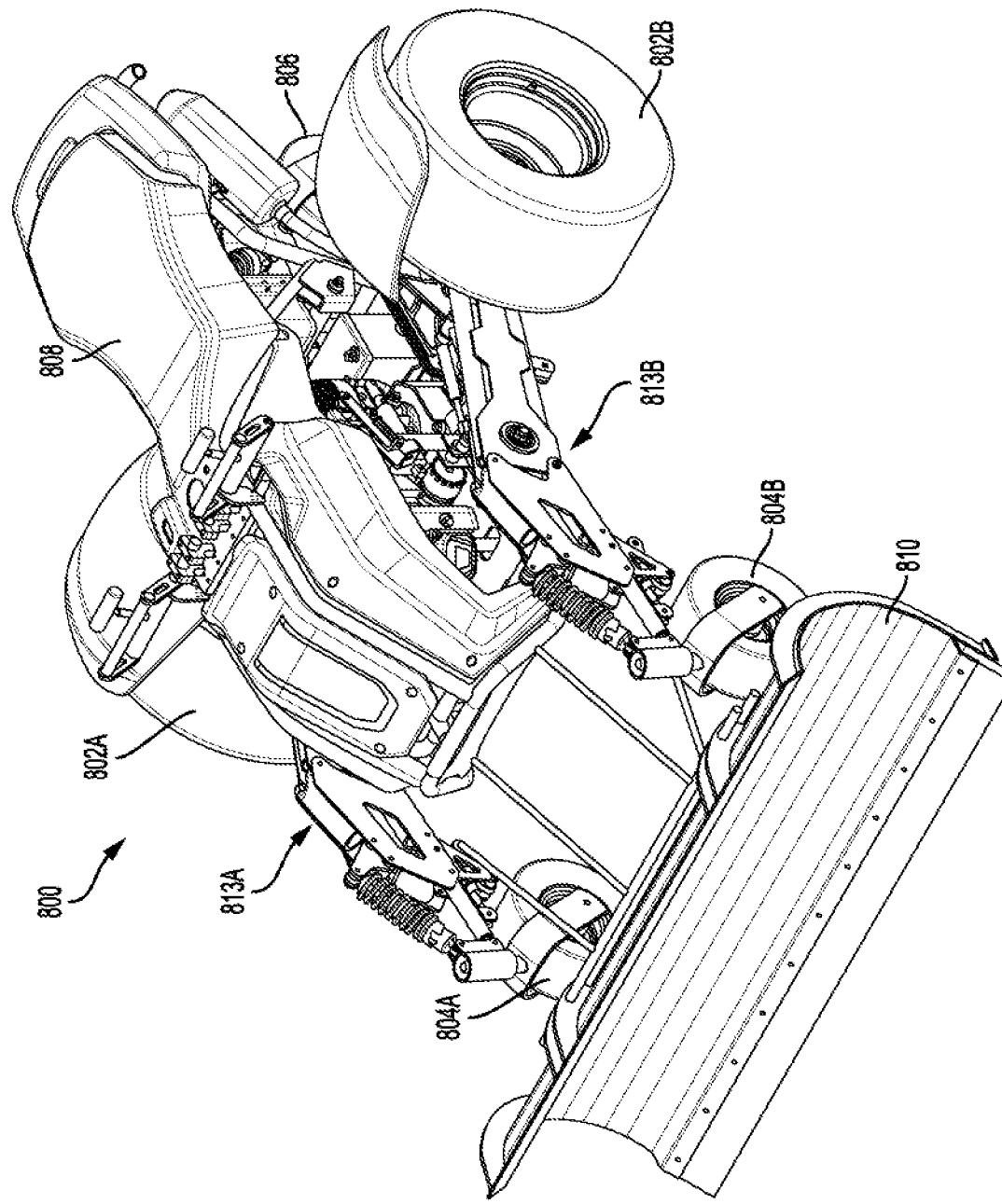
FIG. 22 is a perspective view of a zero turn radius vehicle having a plow attachment in accordance with another aspect of the disclosure.
Figure 23:
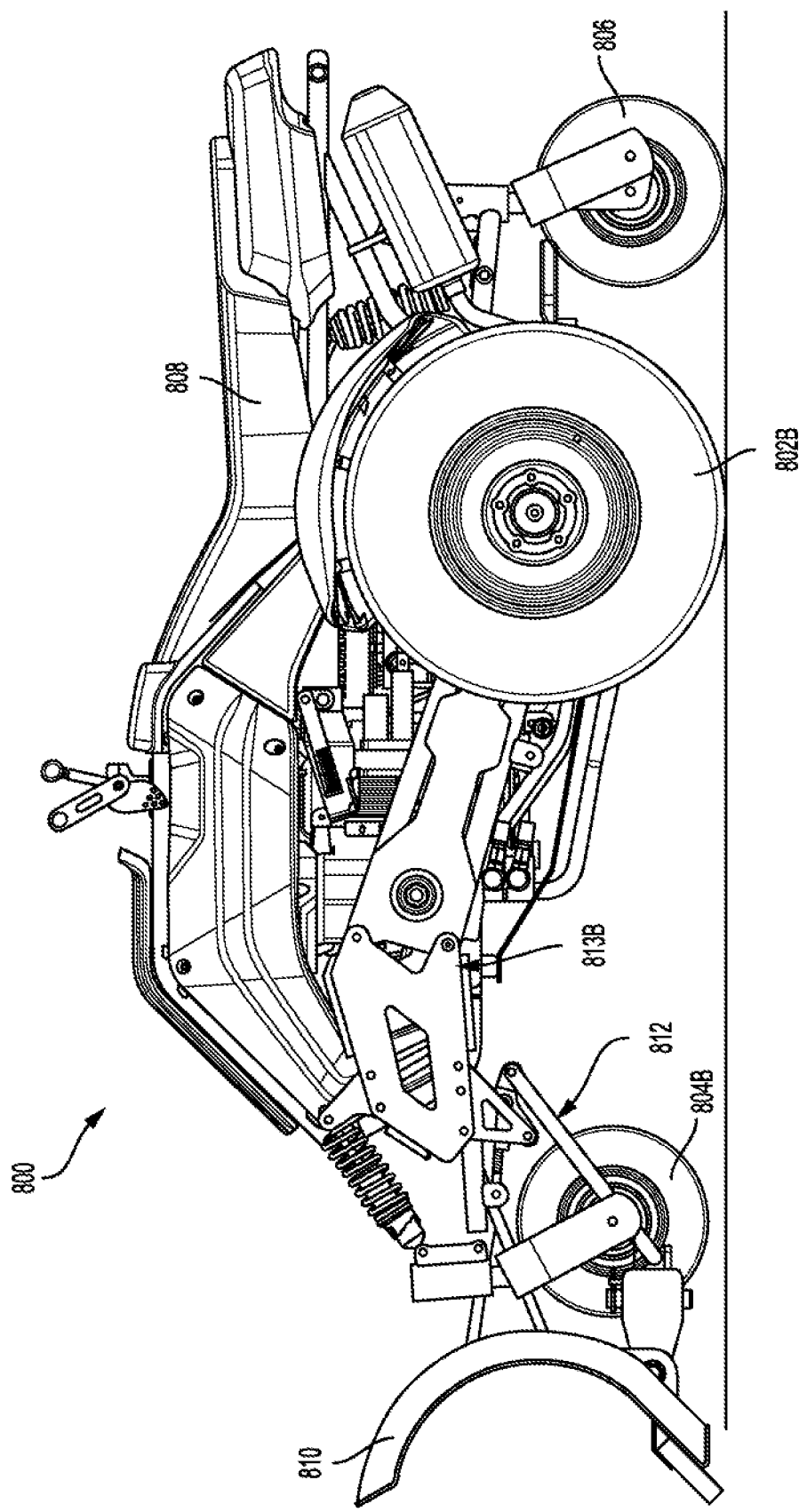
FIG. 23 is a side view of the zero turn radius vehicle of FIG. 22.

Referring now to FIGS. 22-23, a ride-on, zero turn radius vehicle 800 in accordance with another aspect of the disclosure is shown. As described above, the zero turn radius lawnmowers 10, 500, 700 are not limited to use with a mower deck, and may be utilized with various forms of attachments (or no attachments at all). For example, zero turn radius vehicle 800 is shown with a plow 810 coupled to a front end thereof. Zero turn radius vehicle 800, like zero turn radius lawnmowers 10, 500, 700, includes a pair of rear drive wheels 802A, 802B, a pair of front caster wheels 804A, 804B, a (optional) rear caster wheel 806, and a pair of rocker arm assemblies 813A, 813B. The specific components and operation of the rocker arm assemblies 813A, 813B is substantially similar or identical to those of rocker arm assemblies 713 described above with respect to FIG. 21, and thus will not be described in further detail herein.

As shown in FIG. 23, the plow 810 may be coupled to the respective rocker arm assemblies 813A, 813B by a linkage system 812, thereby enabling plow 810 to move in concert with movement of rocker arm assemblies 813A, 813B. Furthermore, while not shown, linkage system 812 may also be coupled to a lift/lower lever or other height adjustment mechanism, allowing the operator to selectively raise the plow 810 for transport and lower the plow 810 for active use. Additionally, while not shown, front caster wheels 804A, 804B and/or rear caster wheel 806 may be removed and replaced with a skid or skis when vehicle 800 is operated with a plow 810. Also, rather than a plow 810, another snow removal attachment (e.g., a snowblower) may be utilized.

Figure 24:
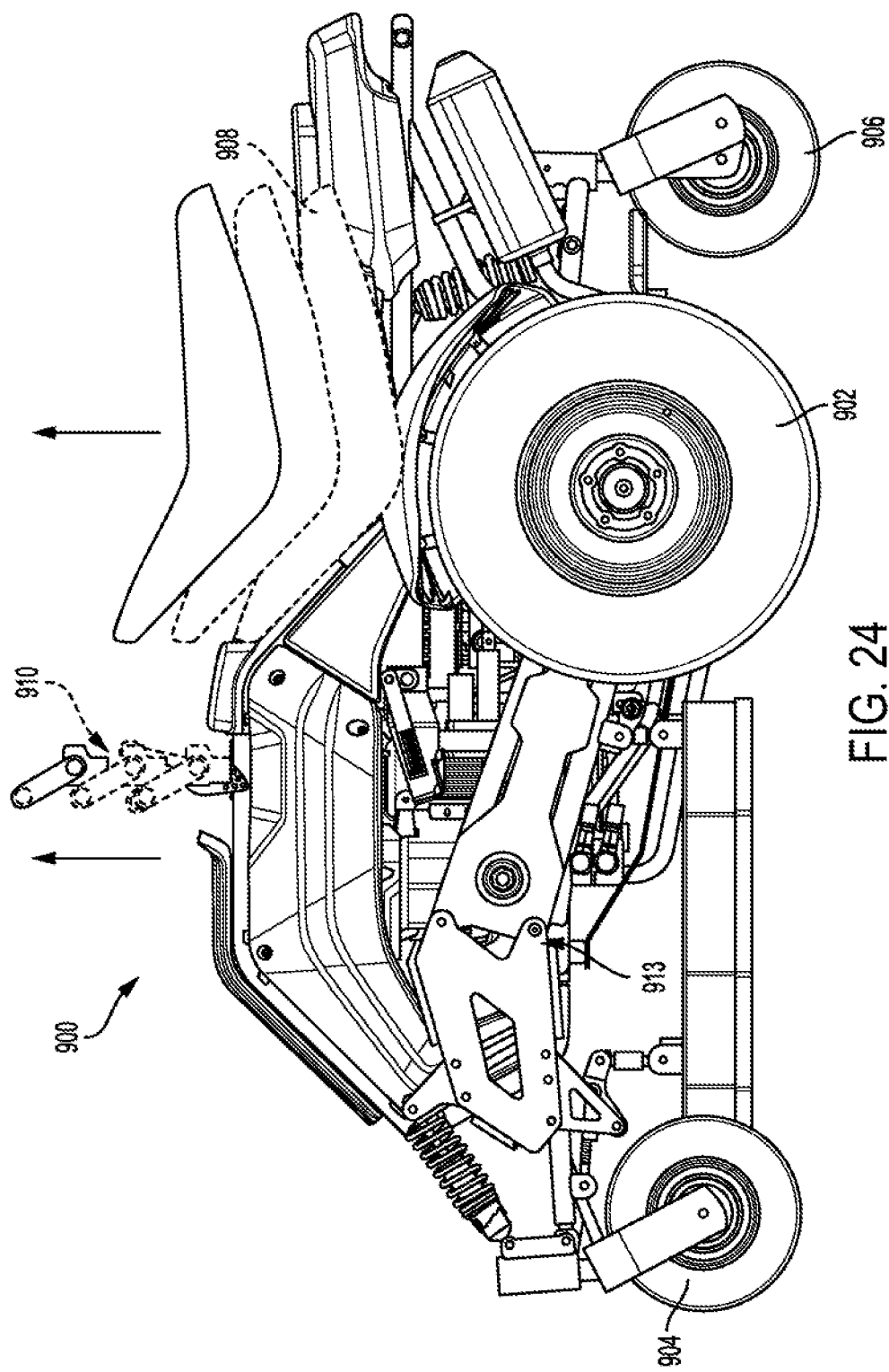
FIG. 24 is a side view of a zero turn radius lawnmower in accordance with another aspect of the disclosure.

Referring to FIG. 24, a zero turn radius vehicle 900 in accordance with another aspect of the disclosure is shown. Again, similar to the zero turn radius vehicle 800 described above with respect to FIGS. 22-23, zero turn radius vehicle 900 includes a pair of rear drive wheels 902, a pair of front caster wheels 904, a (optional) rear caster wheel 906, and a pair of rocker arm assemblies 913. However, zero turn radius vehicle 900 further includes a vertically-adjustable seat 908, along with a vertically-adjustable drive control 910. In this way, the operator may adjust the height of seat 908 and/or drive control 910 to their comfort level, or based on specific applications. Furthermore, while not shown in FIG. 24, it is to be understood that zero turn radius vehicle 900 may be configured as a stand-on vehicle, in some instances with no seat 908. In a stand-on configuration, the operator may utilize both the rocker arm assemblies 913 and their own legs to absorb impacts and adjust to rolling terrain and undulations in the driving surface. Additionally, as opposed to a pair of foot platforms located on opposite sides of a seat, a single platform may be located to the rear of the drive controls, substantially between the drive wheels of the zero turn radius vehicle. Additionally, the drive controls may be located on a control pedestal that is extending from the chassis. The control pedestal may have a thigh pad to provide the operator with an area to lean legs against during periods of operating the zero turn radius vehicle. The single platform for the operator to stand on during periods of operation may have an operator presence sensor. If an operator is not standing on the single platform, then the zero turn radius vehicle will be unable to function. If during periods of operation the operator is no longer on the single platform, the operator presence sensor will initiate a series of events to cause the zero turn radius vehicle to cease operation and shut-off the powering device, an electric power head, internal combustion engine, etc.

Figure 25:
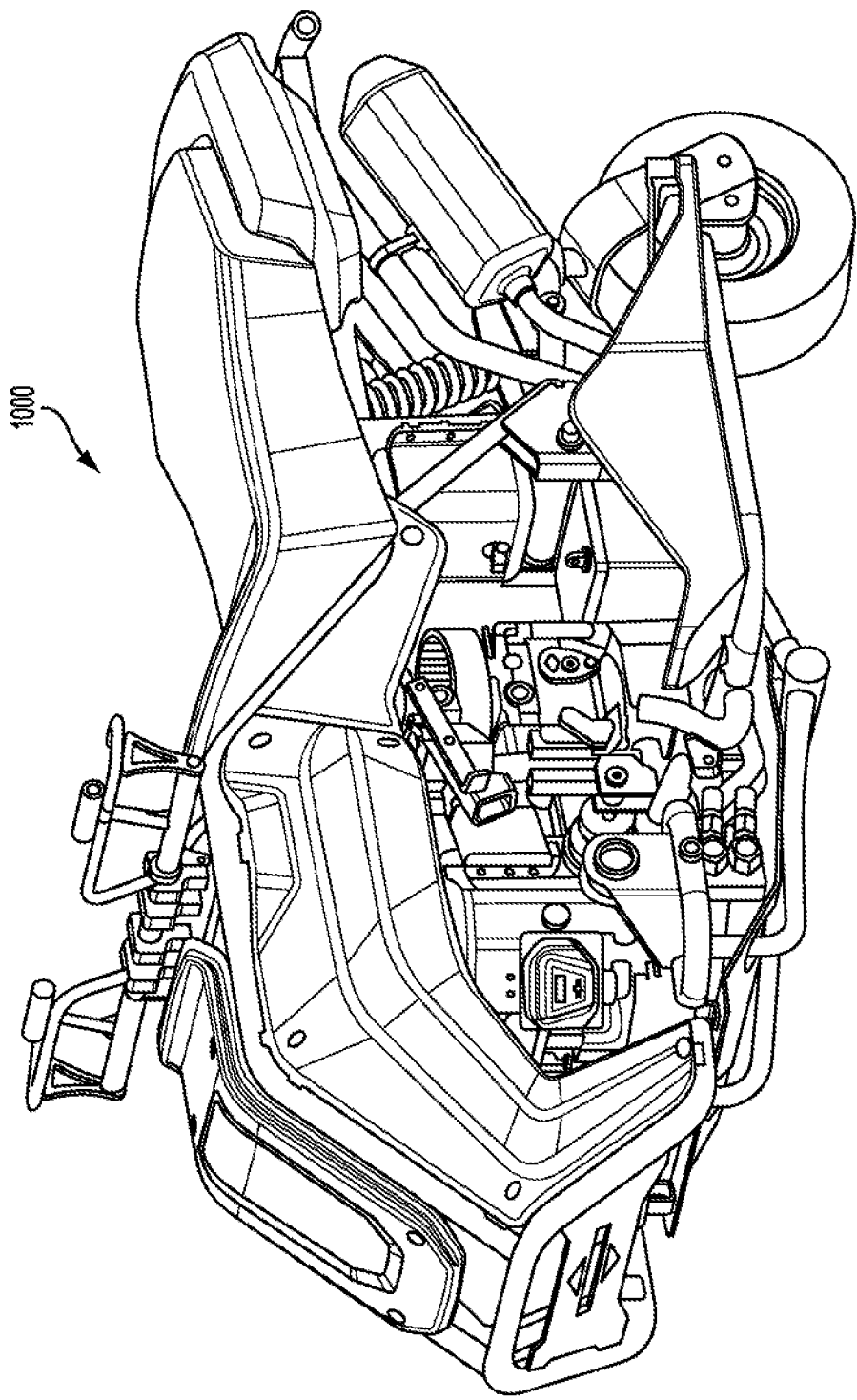
FIG. 25 is a perspective view of a chassis configuration of a zero turn radius vehicle in accordance with an aspect of the disclosure.
Figure 26:
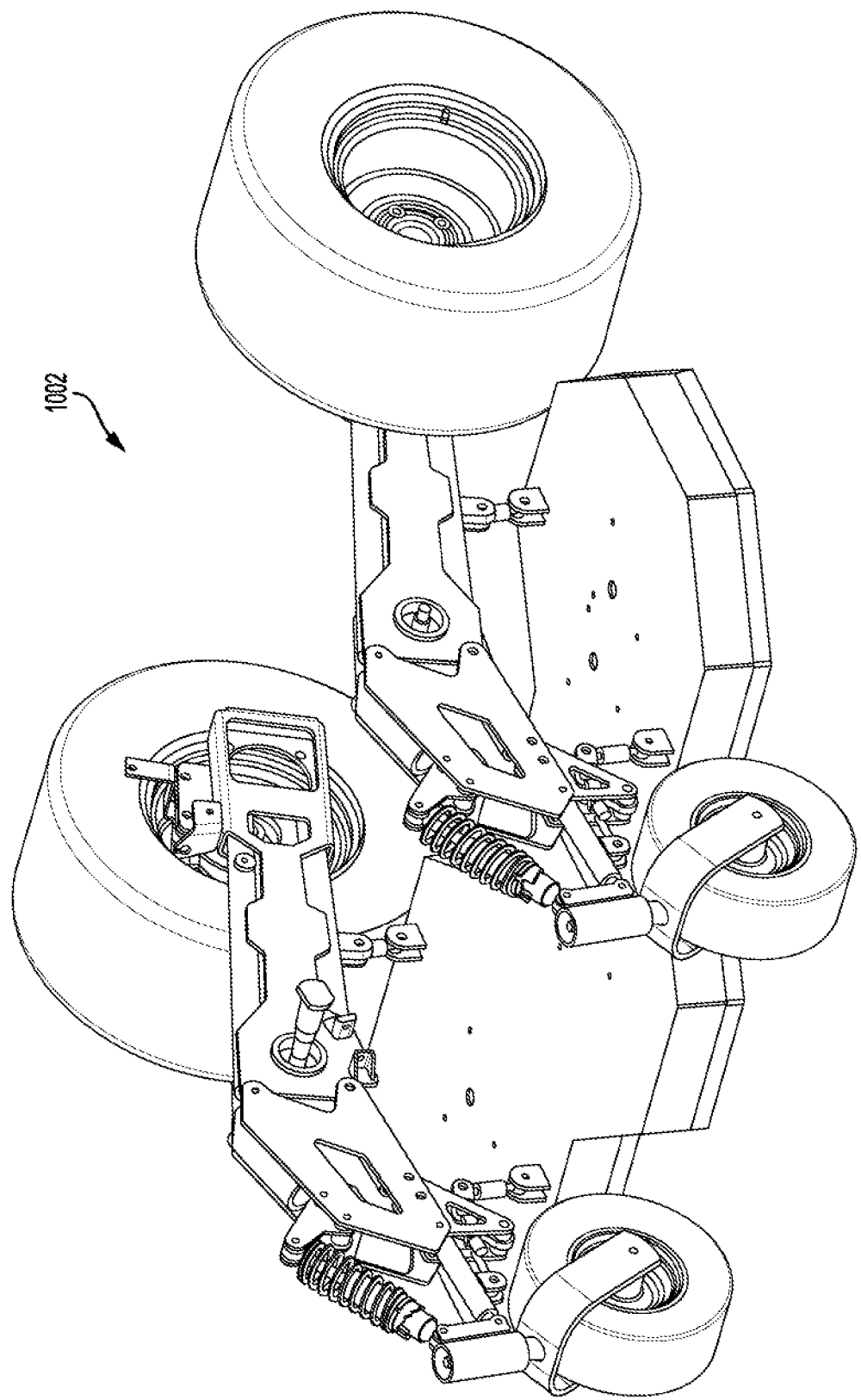
FIG. 26 is a perspective view of a rocker arm assembly and mower deck attachment configuration in accordance with an aspect of the disclosure.

As noted above, a zero turn radius vehicle in accordance with various aspects of the disclosure may be customizable and may include modular components, thereby providing a zero turn radius vehicle with numerous possible configurations. For example, referring to FIGS. 25-26, a ride-on chassis 1000 may be provided, with the ride-on chassis 1000 being provided with various components central to the operation of the vehicle such as, e.g., drive controls, one or more powerheads, hydraulic or electric componentry, etc. The ride-on chassis 1000 may be configured to be attachable to numerous different rocker arm assembly configurations and/or numerous different working attachments. For example, as shown in FIG. 26, a rocker arm assembly 1002 may be provided and may be couplable to ride-on chassis 1000, with the rocker arm assembly 1002 having, e.g., two rear drive wheels, two front caster wheels, and a mower deck mounted therebetween. However, it is to be understood that other ride-on chassis configurations may be utilized (e.g., stand-on chassis configurations, combination sit/stand configurations, chassis configurations with no rear caster wheel, etc.). Furthermore, alternative rocker arm assemblies and/or attachments may also be utilized. For example, as described above, a rocker arm assembly having skids or skis in lieu of caster wheels may be used, and alternative attachments may be coupled to the rocker arm assembly, such as, e.g., a plow, larger/smaller mower decks, etc. In this way, a zero turn radius in accordance with the disclosure may be highly customizable by a user, enabling a single vehicle to be configured for many different applications.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A modular mower deck for use with a lawnmower, the modular mower deck comprising:
    a plurality of mower deck modules, each of the mower deck modules comprising:
        a first central mower deck module and a second central mower deck module, the first central mower deck module and the second central mower deck module fixedly coupled by a reinforcement bar;
        a first outer mower deck module and a second outer mower deck module, the first outer mower deck module removably attachable to the first central mower deck module and the second outer mower deck module removably attachable to the second central mower deck module;
        a blade assembly, the blade assembly comprising at least one mower blade; and
        an electric blade motor configured to provide rotation to the blade assembly;
    an attachment assembly configured to enable attachment between adjacent mower deck modules and comprising;
        a first hinged joint that pivotally attaches the first outer mower deck module to the first central mower deck module; and
        a second hinged joint that pivotally attaches the second outer mower deck module to the second central mower deck module;
    a lithium ion power source electrically coupled to each of the mower deck modules; and
    wherein at least one of the plurality of mower deck modules is configured to be removably attachable to another one of the plurality of mower deck modules.

2. The modular mower deck of claim 1, wherein the attachment assembly comprises a hinged joint, and further wherein the hinged joint enables attached mower deck modules to pivot vertically with respect to one another.

3. The modular mower deck of claim 1, wherein at least one of the mower deck modules further comprises an oscillating discharge chute.

4. The modular mower deck of claim 1, wherein the first central mower deck module and the second central mower deck module are electrically coupled to the lithium ion power source through electrical wiring.

5. The modular mower deck of claim 4, wherein the first outer mower deck module is electrically coupled to the lithium ion power source through the electrical wiring of the first central mower deck module.

6. The modular mower deck of claim 4, wherein the electrical wiring is located atop the modular mower deck.

7. The modular mower deck of claim 1, wherein the mower deck modules further include a third central mower deck module located at least partially between the first central mower deck module, and wherein the third central mower deck module is fixedly coupled to the first central mower deck module and the second central mower deck module by two or more reinforcement bars.

8. The modular mower deck of claim 1, wherein each of the mower deck modules further comprises a discharge chute through which air and debris is expelled from the mower deck module in a direction.

9. The modular mower deck of claim 8, wherein the discharge chute is configured to selectively oscillate during operation causing the direction of the discharge chute to change during operation of the modular mower deck.

10. A modular mower deck for use with a lawnmower, the modular mower deck comprising:
    a plurality of mower deck modules, each of the mower deck modules comprising:
        a discharge chute through which air and debris is expelled from the mower deck module in a direction;
        a blade assembly, the blade assembly comprising at least one mower blade;
        an electric blade motor configured to provide rotation to the blade assembly; and
        an electrical chute motor;
    an attachment assembly configured to enable attachment between adjacent mower deck modules; and
    a lithium ion power source electrically coupled to each of the mower deck modules;
    wherein at least one of the plurality of mower deck modules is configured to be removably attachable to another one of the plurality of mower deck modules
    wherein the electrical chute motor is electrically coupled to the lithium ion power source, the chute motor selectively controlling the direction of the discharge chute, and
    wherein both the chute motor and the electric blade motor are independently controllable.

11. The modular mower deck of claim 10, wherein the electric blade motor is further configured to selectively control the direction of the discharge chute.

12. A modular mower deck for use with a lawnmower, the modular mower deck comprising:

a lithium ion power source electrically coupled to each of the mower deck modules;

a plurality of mower deck modules, each of the mower deck modules comprising:
- a forced air inlet through which clean air is received;
- a forced air inlet device electrically coupled to the lithium ion power source, the forced air inlet device fluidly coupled to the forced air inlet to selectively provide air to the mower deck module;
- a discharge chute through which air and debris is expelled from the mower deck module in a direction;
- a blade assembly, the blade assembly comprising at least one mower blade; and
- an electric blade motor configured to provide rotation to the blade assembly; and an attachment assembly configured to enable attachment between adjacent mower deck modules;

wherein at least one of the plurality of mower deck modules is configured to be removably attachable to another one of the plurality of mower deck modules.

13. The modular mower deck of claim 12, wherein, during operation, clean air enters through the forced air inlet and provides an uplifting force on grass or vegetation located below the blade assembly.

14. A modular mower deck for use with a lawnmower, the modular mower deck comprising:
- a plurality of mower deck modules, each of the mower deck modules comprising:
- a first mower deck module and a second mower deck module;
    - a blade assembly, the blade assembly comprising at least one mower blade; and
    - an electric blade motor configured to provide rotation to the blade assembly;
- an attachment assembly configured to enable attachment between adjacent mower deck modules; and
- a lithium ion power source electrically coupled to each of the mower deck modules;
- wherein at least one of the plurality of mower deck modules is configured to be removably attachable to another one of the plurality of mower deck modules;
- wherein the first mower deck module includes a first plurality of linkages and the second mower deck module includes a second plurality of linkages;
- wherein the first mower deck module is suspended from a first rocker arm of the lawnmower through the first plurality of linkages, wherein the first rocker arm is rotatably coupled to a first caster wheel at a first end of the first rocker arm and is rotatably coupled to a first drive wheel at a second end of the first rocker arm; and
- wherein the second mower deck module is suspended from a second rocker arm of the lawnmower through the second plurality of linkages, wherein the second rocker arm is rotatably coupled to a second caster wheel at a first end of the second rocker arm and is rotatably coupled to a second drive wheel at a second end of the second rocker arm.

15. The modular mower deck of claim 14, wherein when the lawnmower is travelling across terrain, a distance between the first mower deck module and the terrain is at least partially based on a position of the first caster wheel and a position of the first drive wheel and a distance between the second mower deck module and the terrain is at least partially based on a position of the second caster wheel and a position of the second drive wheel.

16. The modular mower deck of claim 15, wherein the lawnmower further includes a main chassis, and wherein the first mower deck module and the second mower deck module are located at least partially under the main chassis.

17. The modular mower deck of claim 16, wherein the first rocker arm and the second rocker arm are pivotally coupled to the main chassis.

18. The modular mower deck of claim 17, wherein the blade assembly comprises at least two mower blades.

19. The modular mower deck of claim 18, wherein each of the mower deck modules further comprises a ground following roller.

20. The modular mower deck of claim 14, wherein each of the mower deck modules further comprises a discharge chute through which air and debris is expelled from the mower deck module in a direction.

* * * * *